US012729976B2

(12) United States Patent
Morison et al.

(10) Patent No.: US 12,729,976 B2
(45) Date of Patent: Sep. 8, 2026

(54) CORRECTIVE LOOK-AHEAD ROAD PROFILING SYSTEM AND METHOD FOR ENHANCED ACTIVE SUSPENSION PERFORMANCE IN VEHICLES

(71) Applicant: LAWRENCE TECHNOLOGICAL UNIVERSITY, Southfield, MI (US)

(72) Inventors: Dane MacGregor Morison, Troy, MI (US); James Andrew Mynderse, Berkley, MI (US)

(73) Assignee: LAWRENCE TECHNOLOGICAL UNIVERSITY, Southfield, MI (US)

( * ) Notice: Subject to any disclaimer, the term of this patent is extended or adjusted under 35 U.S.C. 154(b) by 0 days.

(21) Appl. No.: 19/194,766

(22) Filed: Apr. 30, 2025

(65) Prior Publication Data

US 2025/0334423 A1 Oct. 30, 2025

Related U.S. Application Data

(60) Provisional application No. 63/640,757, filed on Apr. 30, 2024.

(51) Int. Cl.
*G01C 21/00* (2006.01)
*B60G 17/016* (2006.01)
(Continued)

(52) U.S. Cl.
CPC ....... *G01C 21/3819* (2020.08); *B60G 17/016* (2013.01); *G01C 21/1652* (2020.08);
(Continued)

(58) Field of Classification Search
CPC ............ G01C 21/3819; G01C 21/1652; G01C 21/3837; B60G 17/016; B60G 2400/0512;
(Continued)

(56) References Cited

U.S. PATENT DOCUMENTS 12,306,011 B2 * 5/2025 Zeng ................ G08G 1/096775

OTHER PUBLICATIONS

Yu, Min, et al., "Advances in Active Suspension Systems for Road Vehicles," Engineering, vol. 33, 2024, pp. 160-177, ISSN 2095-8099, https://doi.org/10.1016/j.eng.2023.06.014.

(Continued)

*Primary Examiner* — Xiao En Mo
(74) *Attorney, Agent, or Firm* — Jacob M. Ward; Ward Law Office LLC

(57) ABSTRACT

The disclosure relates to an advanced system for enhancing active suspension in vehicles through predictive road profiling. The system employs a novel combination of sensors and algorithms to accurately predict road irregularities before the vehicle encounters them. This predictive capability allows for real-time adjustments to the suspension system, optimizing vehicle handling, comfort, and safety. The system includes a look-ahead sensor mechanism that measures the road profile at a distance ahead of the vehicle and computes the anticipated road conditions using a sophisticated algorithm that accounts for vehicle dynamics such as speed, pitch, and heave. The processed data is then used to adjust the suspension settings preemptively, mitigating the impact of road irregularities and improving the overall driving experience. This technology addresses the limitations of current active suspension systems by enhancing their predictive accuracy and operational efficiency.

20 Claims, 24 Drawing Sheets

(51) Int. Cl.
*G01C 21/16* (2006.01)
*G06V 20/56* (2022.01)

(52) U.S. Cl.
CPC ....... *G01C 21/3837* (2020.08); *G06V 20/588* (2022.01); *B60G 2400/0512* (2013.01); *B60G 2400/204* (2013.01); *B60G 2400/82* (2013.01); *B60G 2401/21* (2013.01)

(58) Field of Classification Search
CPC .......... B60G 2400/204; B60G 2400/82; B60G 2401/21; B60G 2400/821; B60G 2400/823; B60G 2401/14; B60G 2401/142; B60G 2401/174; B60G 2600/182; B60G 17/0165; G06V 20/588
See application file for complete search history.

(56) References Cited

OTHER PUBLICATIONS

Theunissen, Johan, et al., "Regionless Explicit Model Predictive Control of Active Suspension Systems With Preview," IEEE Transactions on Industrial Electronics, 2019, vol. 67, No. 6, pp. 4877-4888, DOI: 10.1109/TIE.2019.2926056.
Theunissen, Johan, et al., "Preview-based techniques for vehicle suspension control: a state-of-the-art review," Annual Reviews in Control, vol. 51, 2021, pp. 206-235, https://doi.org/10.1016/j.arcontrol.2021.03.010.
Kat, C.J. and Els P. S., "Validation metric based on relative error," Mathematical and Computer Modelling of Dynamical Systems, Methods, Tools and Applications in Engineering and Related Sciences, vol. 18, No. 5, pp. 487-520, 2012, https://doi.org/10.1080/13873954.2012.663392.
Montanez, G., et al., "Comparison of model predictive control techniques for active suspension," 2015 International Conference on Applied Electronics (AE), pp. 157-160. IEEE, 2015, Electronic ISBN:978-8-0261-0386-8.
Rajasekharan, Unnithan, A. and Subramaniam, S., "Enhancing Ride Comfort and Stability of a Large Van Using an Improved Semi-active Stability Augmentation System," SAE Int. J. Veh. Dyn., Stab., and NVH 6(4):385-403, 2022, https://doi.org/10.4271/10-06-04-0026.
Desikan, Arvind, and Kalaichelvi, V., "Design for a preview control of semi-active suspension system using fuzzy-logic and image processing techniques." In 2015 IEEE International Conference on Electro/Information Technology (EIT), pp. 224-229. IEEE, 2015, 10.1109/EIT.2015.7293426.
Ho, C. M., et al., "Adaptive sliding mode control based nonlinear disturbance observer for active suspension with pneumatic spring," Journal of Sound and Vibration, vol. 509, p. 116241, Sep. 2021, https://doi.org/10.1016/j.jsv.2021.116241.
Ghadiri, H. and Montazeri, A., "Adaptive Integral Terminal Sliding Mode Control for the Nonlinear Active Vehicle Suspension System under External Disturbances and Uncertainties," IFAC-PapersOnLine, vol. 55, No. 10, pp. 2665-2670, Jan. 2022, https://doi.org/10.1016/j.ifacol.2022.10.112.
Soliman, A. M. A et al., "Evaluation of Ride Performance through a Comparative Study of Switchable Damper and Active Suspension by Using Fuzzy and Linear Quadratic Regulator Controller's Strategies," SAE International Journal of Vehicle Dynamics, Stability, and NVH 5(1):15-30, 2021, https://doi.org/10.4271/10-05-01-0002.
Ekoru, J. E. D., et al., "PID control of a nonlinear half-car active suspension system via force feedback," IEEE Africon '11, pp. 1-6, 9, 2011, DOI: 10.1109/AFRCON.2011.6071979.
"Mechanical Vibration and Shock—Evaluation of Human Exposure to Whole-Body Vibration," ISO, 1997.
Tabatabaei, M. and Barati-Boldaji, R., "Non-overshooting PD and PID controllers design," Automatika, vol. 58, No. 4, pp. 400-409, Oct. 2017, https://doi.org/10.1080/00051144.2018.1471824.
Jeong, Jae-Hoon et al., "Preview Control of Automotive Active Suspension Systems to Improve Ride Comfort Using V2V Communication," 2021 21st International Conference on Control, Automation and Systems (ICCAS), pp. 1726-1729, Oct. 2021, DOI: 10.23919/ICCAS52745.2021.9649772.
Kaldas, M. M., et al., "Road Preview Control for Active Suspension System," SAE Int. J. Veh. Dyn., Stab., and NVH 6(4):371-383, 2022, https://doi.org/10.4271/10-06-04-0025.
Zhu, Y., et al., "Ride Comfort Improvement with Preview Control Semi-active Suspension System Based on Supervised Deep Learning," SAE Int. J. Veh. Dyn., Stab., and NVH 5(1):31-44, 2021, https://doi.org/10.4271/10-05-01-0003.
Gohrle, Christoph, et al., "Road profile estimation and preview control for low-bandwidth active suspension systems." IEEE/ASME Transactions on Mechatronics 20, No. 5 (2014): 2299-2310, DOI: 10.1109/TMECH.2014.2375336.
Forkel Bianca, and Wuensche, Hans-Joachim, "Dynamic resolution terrain estimation for autonomous (dirt) road driving fusing lidar and vision." In 2022 IEEE Intelligent Vehicles Symposium (IV), pp. 1181-1187. IEEE, 2022, 10.1109/IV51971.2022.9827214.
Yalcin O., et al., "Detection of road boundaries and obstacles using LIDAR." In 2014 6th Computer Science and Electronic Engineering Conference (CEEC), pp. 6-10. IEEE, 2014, DOI: 10.1109/CEEC.2014.6958546.
Ahmed, Mahmoud M., and Svaricek, Ferdinand, "Preview optimal control of vehicle semi-active suspension based on partitioning of chassis acceleration and tire load spectra." In 2014 European Control Conference (ECC), pp. 1669-1674. IEEE, 2014, DOI: 10.1109/ECC.2014.6862615.
Dawkins, Jeremy J., "Model based off-road terrain profile estimation." In 2014 American Control Conference, pp. 2792-2797. IEEE, 2014, DOI: 10.1109/ACC.2014.6859189.
Pozderac, Tarik, et al., "3D mapping based on fusion of 2D laser and IMU data acquired by unmanned aerial vehicle." In 2019 6th International Conference on Control, Decision and Information Technologies (CoDIT), pp. 1533-1538. IEEE, 2019, DOI: 10.1109/CoDIT.2019.8820583.
Wang, Jianjun, et al., "A proposal to compensate platform attitude deviation's impact on laser point cloud from airborne LiDAR.", IEEE Transactions on Instrumentation and Measurement 62, No. 9 (2013): 2549-2558, DOI: 10.1109/TIM.2013.2256763.
Maroli, John M., et al., "Automated rotational calibration of multiple 3D LIDAR units for intelligent vehicles." In 2017 IEEE 20th International Conference on Intelligent Transportation Systems (ITSC), pp. 1-6. IEEE, 2017, DOI: 10.1109/ITSC.2017.8317598.
Wei, Weichen, et al., "Orientation correction for hector slam at starting stage." In 2019 7th International Conference on Robot Intelligence Technology and Applications (RiTA), pp. 125-129. IEEE, 2019, DOI: 10.1109/RITAPP.2019.8932722.
Renzler, Tobias, et al.,"Increased accuracy for fast moving LiDARS: Correction of distorted point clouds." In 2020 IEEE international instrumentation and measurement technology conference (I2MTC), pp. 1-6. IEEE, 202, DOI: 10.1109/12MTC43012.2020.9128372.
Li, Li and Liao, Fucheng, "Robust preview control for a class of uncertain discrete-time systems with time-varying delay", ISA Transactions, vol. 73, Feb. 2018, pp. 11-21, https://doi.org/10.1016/j.isatra.2018.01.005.
Chen, Cheng-Lun, et al.,"Robust spatial-sampling controller design for banding reduction in electrophotographic process.", Journal of Imaging Science and Technology 50, No. 6 (2006): 530-536, DOI: 10.2352/J.ImagingSci.Technol.200650:6530.
Chen, Cheng-Lun, and Chiu, George T-C, "Spatially periodic disturbance rejection with spatially sampled robust repetitive control." J. Dyn. Sys., Meas., Control. Mar. 2008, 130(2): 021002 (11 pages), https://doi.org/10.1115/1.2837306.
Dhiman, Amita, et al., "A multi-frame stereo vision-based road profiling technique for distress analysis." In 2018 15th international symposium on pervasive systems, algorithms and networks (I-SPAN), pp. 7-14. IEEE, 2018, DOI: 10.1109/I-SPAN.2018.00012.
Arun, Greeshma K., et al., "Deep Learning for Pothole Detection: Exploring YOLO V8 Algorithm's Performance in Pavement Detection." In 2024 International Conference on Data Science and Network Security (ICDSNS), pp. 1-7. IEEE, 2024, DOI: 10.1109/ICDSNS62112.2024.10690953.

(56) References Cited

OTHER PUBLICATIONS

Shan, Yunxiao, et al., "LiDAR based traversable regions identification method for off-road UGV driving." IEEE Transactions on Intelligent Vehicles 9, No. 2 (2023): 3544-3557, DOI: 10.1109/TIV.2023.3342801.
Kollmer, Hermann, et al., "Measurement and fatigue damage evaluation of road profiles in customer operation." International journal of vehicle design, 56, No. 1-4 (2011): 106-124, https://doi.org/10.1504/IJVD.2011.043265.
Chen, Guoying, et al., "Estimation of lateral velocity and cornering stiffness in vehicle dynamics based on multi-source information fusion." SAE International Journal of Vehicle Dynamics, Stability, and NVH 8(1):31-47, 2024, https://doi.org/10.4271/10-08-01-0003.
Kidambi, N., et al., "Accuracy and Robustness of Parallel Vehicle Mass and Road Grade Estimation," SAE International Journal of Vehicle Dynamics, Stability, and NVH 1(2):317-325, 2017, https://doi.org/10.4271/2017-01-1586.
Akbari, Ahmad, et al., "Multi-objective preview control of active vehicle suspensions: Experimental results." In 2010 2nd International Conference on Advanced Computer Control, vol. 3, pp. 497-502. IEEE, 2010, DOI: 10.1109/ICACC.2010.5486804.
Huang, H., et al., "Virtual Functional Testing of a Mechatronic Active Roll Control," SAE Technical Paper 2018-01-5012, 2018, https://doi.org/10.4271/2018-01-5012.
Yatak, Meral Özarslan, and Şahin, Fatih, "Ride comfort-road holding trade-off improvement of full vehicle active suspension system by interval type-2 fuzzy control", Engineering Science and Technology, an International Journal vol. 24, Issue 1, Feb. 2021, pp. 259-270, https://doi.org/10.1016/j.jestch.2020.10.006.
Zöller, Chris, et al., "Preview of Driving Surface Unevenness in Wheeled Mobile Driving Simulators." In 2018 21st International Conference on Intelligent Transportation Systems (ITSC), pp. 3044-3050. IEEE, 2018, DOI: 10.1109/ITSC.2018.8569269.
Akçay, Hüseyin, and Türkay, Semiha, "Cramer-Rao bounds for road profile estimation", In 2017 IEEE 3rd Colombian Conference on Automatic Control (CCAC), pp. 1-5. IEEE, 2017,DOI: 10.1109/CCAC.2017.8276423.
Diange, Yang, et al., "Research on rapid measurement of medium short wave longitudinal road profiles", In 2010 International Conference on Electrical and Control Engineering, pp. 1742-1745. IEEE, 2010, DOI: 10.1109/iCECE.2010.429.
Zhao, Jing, et al., "Integrated variable speed-fuzzy PWM control for ride height adjustment of active air suspension systems", In 2015 American Control Conference (ACC), pp. 5700-5705. IEEE, 2015, DOI: 10.1109/ACC.2015.7172232.
Göhrle, Christoph, et al., "Design and vehicle implementation of preview active suspension controllers", IEEE Transactions on Control Systems Technology 22, No. 3 (2013): 1135-1142, DOI: 10.1109/TCST.2013.2272342.

* cited by examiner

Look-Ahead Sensor Angle (LASA) = -29.7184

Look-Ahead Sensor Angle (LASA) = -43.5051

Look-Ahead Sensor Angle (LASA) = -28.8919

FIG. 9

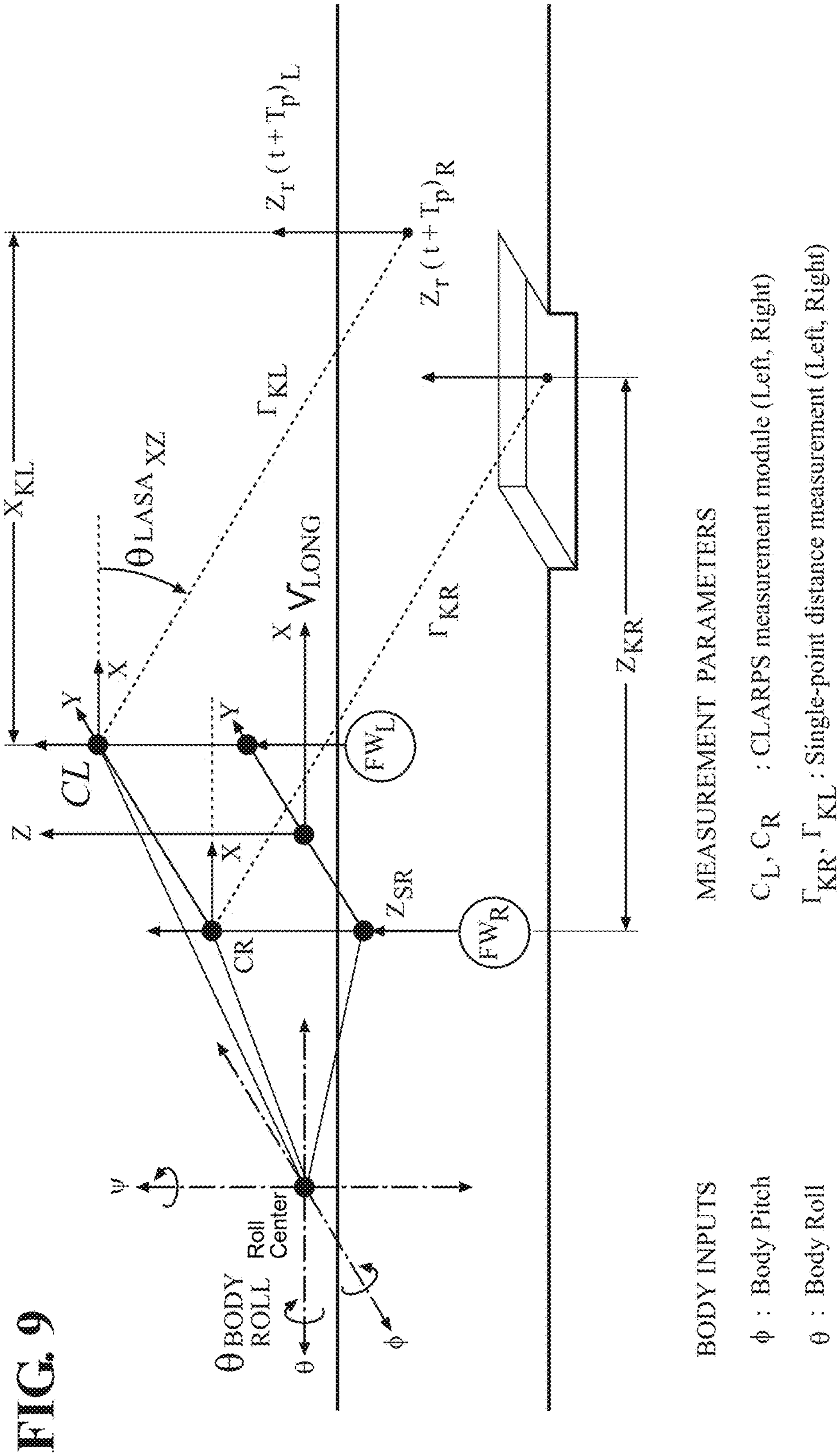

BODY INPUTS

ϕ : Body Pitch

θ : Body Roll

ψ : Body Yaw $V_{LONG}$: Body Longitudinal Velocity $Z_{SR}$ : Heave (Front Left)

$Z_{SL}$ : Heave (Front Right)

MEASUREMENT PARAMETERS $C_L$, $C_R$ : CLARPS measurement module (Left, Right)

$\Gamma_{KR}$, $\Gamma_{KL}$ : Single-point distance measurement (Left, Right)

$Z_r(t+T_p)$, $Z_r(t+T_p)_R$ : Future vertical road profile height (Left, Right)

$X_{KL}$, $X_{KR}$: Future longitudinal road profile distance ahead (Left, Right)

$\theta LASA_{XZ}$ : Look-ahead Sensing Angle (LASA) in X-Z plane

FW , FW : Front wheels-visual representation-to indicate trave path (Left, Right)

$$t_s = t_o + nT_s$$

$$x_n(t_n) = vt_o + vnT_s$$

$$T_x = x_n - x_{n-1} = vT_s$$

$$f_x = \frac{1}{T_x} = \frac{1}{vT_s} = \frac{1}{v} f_s$$

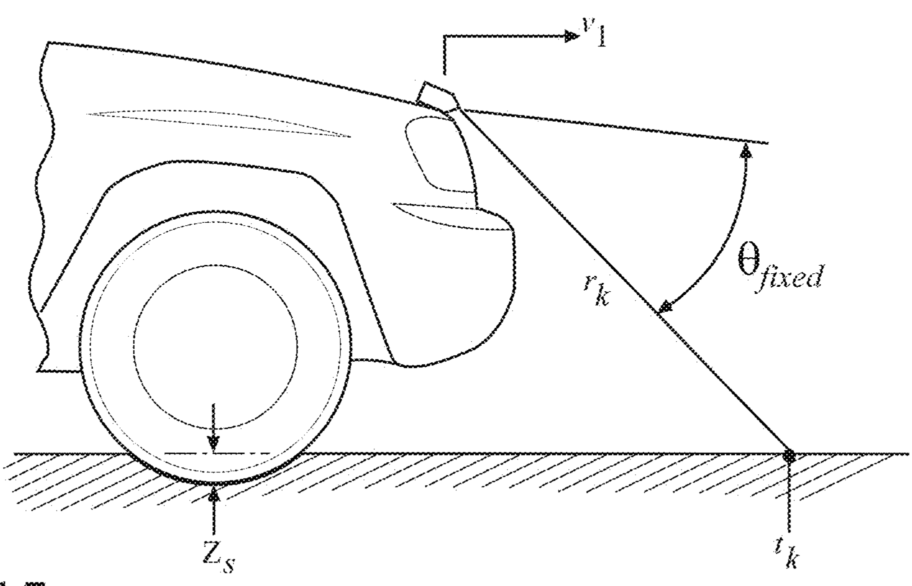
FIG. 15
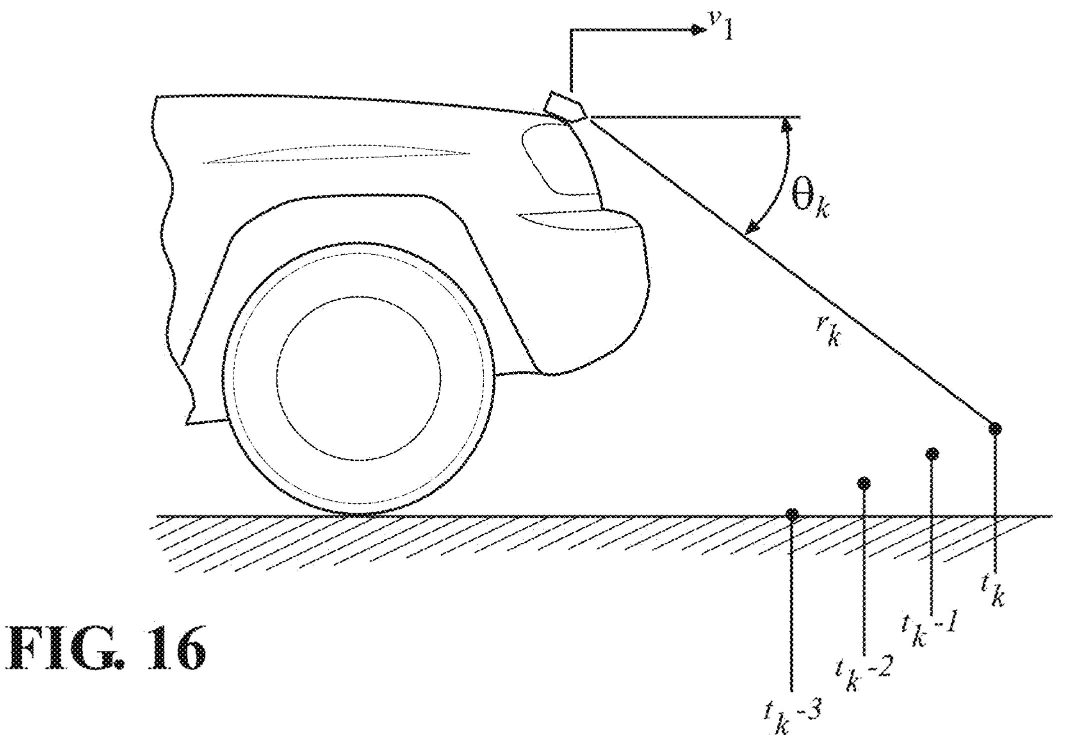
FIG. 16

CORRECTIVE LOOK-AHEAD ROAD PROFILING SYSTEM AND METHOD FOR ENHANCED ACTIVE SUSPENSION PERFORMANCE IN VEHICLES

CROSS-REFERENCE TO RELATED APPLICATIONS

This application claims the benefit of U.S. Provisional Application Ser. No. 63/640,757, filed on Apr. 30, 2024. The entire disclosure of the above application is hereby incorporated herein by reference.

FIELD

The present technology relates to automotive suspension systems and, more particularly, to systems and methods for predictive road profiling to enhance active suspension performance in vehicles.

INTRODUCTION

This section provides background information related to the present disclosure which is not necessarily prior art.

In the realm of automotive engineering, particularly in the development of suspension systems, there has been a continuous pursuit to enhance vehicle ride comfort and handling through advanced suspension technologies. Traditional suspension systems, such as passive and semi-active systems, have provided foundational improvements by absorbing and damping road-induced vibrations and impacts. However, these systems often fall short in preemptively adjusting to road irregularities, relying instead on reactive measures that only respond after encountering disturbances. For a suspension system to be considered as truly "active," it would proactively actuate itself at one, or more likely all four, corners of the vehicle based on preview information of oncoming road profiles.

The advent of active suspension systems marked a significant advancement, offering the potential for real-time adjustment to suspension settings based on road conditions. These systems utilize various sensors to detect road features and dynamically adjust the suspension to optimize vehicle handling and comfort. Exemplary proposed reactive systems are described by Yu, et al in a publication titled "Advances in Active Suspension Systems for Road Vehicles" (hereinafter referred to as "Yu"); available at [www.sciencedirect.com/science/article/pii/S2095809923003983], and Theunissen, et al. in a publication titled "Regionless Explicit Model Predictive Control of Active Suspension Systems With Preview" and "Preview-based techniques for vehicle suspension control: a state-of-the-art review," (hereinafter referred to as "Theunissen 1 & 2"), each of which is incorporated herein by reference in their entirety.

Advancements in road profiling have predominantly followed the vehicle-to network (V2X) model of data acquisition. In this model, vehicles in a convoy operate such that the lead vehicle encounters and records road disturbances first. This data is then uploaded to a network and shared with the following vehicles, which are equipped with actuators. These actuators proactively adjust the vehicles' suspensions to mitigate the impact of the recorded disturbances.

Despite these advancements, current active suspension systems still face limitations, particularly in their dependency on immediate road condition inputs, which do not allow for anticipatory adjustments based on road conditions ahead of the vehicle. The V2X model, in particular, is significantly limited in its applicability because it presupposes that all subsequent vehicles will travel exactly the same path as the lead vehicle.

One of the helpful challenges in further enhancing active suspension systems is therefore the accurate and reliable prediction of road profiles ahead of the vehicle. Existing systems often rely on technologies such as cameras and radar, which can be impeded by environmental factors such as poor lighting, adverse weather conditions, and limited range and resolution. These limitations hinder the system's ability to effectively predict and prepare for upcoming road irregularities, thus impacting the overall performance of the suspension system.

Moreover, the computational complexity involved in processing sensor data and executing suspension adjustments in real-time presents another significant challenge. The need to process vast amounts of data from multiple sensors quickly and accurately requires substantial computational resources, which can be a constraint in vehicular systems where processing power and energy efficiency are helpful considerations. Yu and Theunissen 1 & 2 describe calculations intended to achieve improved efficiency in such systems.

Additionally, the integration of sensor data to form a coherent and accurate road profile involves complex algorithms that must account for the relative motion of the vehicle, including factors such as speed, pitch, and heave. These dynamics add another layer of complexity to the accurate prediction of road conditions, as the sensor's frame of reference continually shifts relative to the road surface. Similarly, as described in Yu, the system can include control of other modules (e.g., steering and braking) and may be used in autonomous vehicles.

The calibration and maintenance of sensors also pose practical challenges in deploying advanced active suspension systems. Sensors must be precisely calibrated to ensure accuracy, and they must be maintained regularly to prevent degradation in performance over time. This requirement increases the overall cost and complexity of the system, making it less accessible for widespread adoption in consumer vehicles.

There is a continuing need for improved systems and methods that can overcome the limitations of current active suspension technologies. Desirably, such systems would provide more reliable and accurate road profiling capabilities, enhanced computational efficiency, and greater robustness against environmental factors, thereby significantly improving the predictive capabilities and overall effectiveness of active suspension systems.

SUMMARY

In concordance with the instant disclosure, improved systems and methods that can overcome the limitations of current active suspension technologies, and which provide more reliable and accurate road profiling capabilities, enhanced computational efficiency, and greater robustness against environmental factors, thereby significantly improving the predictive capabilities and overall effectiveness of active suspension systems, have surprisingly been discovered.

The present technology includes articles of manufacture, systems, and processes that relate to the dynamic adjustment of vehicle suspension systems based on predictive road profiling to enhance ride comfort and handling efficiency. The technology presents several features that distinguish it from existing active suspension technologies. At its core, the system's innovative approach combines a single-point LiDAR sensor with three integrated subsystems (AGF, AKS, and MCA, detailed further hereinbelow) to maintain a consistent measurement point ahead of the vehicle while accounting for dynamic vehicle movements. Unlike existing camera-based or V2X systems, the system and method of the present technology process all data onboard the vehicle using a unique trigonometric-based measurement system that enables faster processing and more accurate depth measurements. This ability to maintain a precise 250-millisecond preview window through its dynamic angle adjustment mechanism, while achieving significant road profile accuracy, represents a significant advancement over current technologies. The novel architecture of the present technology, particularly its measurement correction algorithm that splits corrected road profiles into vertical and longitudinal components relative to the tire contact patch, enables accurate road profiling without relying on pre-coded road data or network connectivity. Additionally, the ability of the present system and method to adapt to varying vehicle speeds while maintaining consistent spatial sampling through its polynomial curve-fit angle adjustment represents a unique technical solution not found in existing active suspension systems. The technology also addresses a previously unsolved problem in the industry by providing real-time, accurate road profiling capability that can capture both permanent and transient road conditions while operating at frequencies exceeding 50 Hz.

In one embodiment, a system for enhancing active suspension in vehicles includes a look-ahead sensor, a processing unit, an active suspension controller, a data storage unit, and a communication interface. This system is designed to measure road profiles ahead of a vehicle and adjust the vehicle's suspension settings preemptively based on the anticipated road conditions. The integration of these components allows for real-time adjustments to the suspension system, enhancing vehicle stability and passenger comfort by adapting to road irregularities before they are encountered.

In certain implementations, the look-ahead road profiling system includes three main subsystems that may be implemented via the processing unit and the data storage unit, namely: the angle generating function (AGF), the angle keeping system (AKS), and the measurement correction algorithm (MCA).

The AGF is an important subsystem of CLARPS that calculates the optimal look-ahead angle for the LiDAR sensor using helpful vehicle dynamic inputs including longitudinal velocity, pitch, and heave. The AGF processes these measured inputs to generate a reference angle that enables the sensor to maintain consistent spatial sampling of the road surface ahead of the vehicle. This reference angle computation is essential to the invention because it ensures the system can maintain a constant preview distance that provides the helpful 250-millisecond advance notice required for active suspension response, while accounting for varying vehicle speeds and dynamic conditions. The AGF works in concert with the AKS and MCA subsystems, where it provides the computed reference angle to the AKS for physical orientation maintenance, while the MCA uses this angle along with actual sensor position data to correct the measurement frame-of-reference, ultimately enabling the system to achieve significant road profile accuracy rates.

The AKS is also an important subsystem that maintains a consistent look-ahead sensing angle for the LiDAR sensor despite the vehicle's dynamic movements. The AKS receives a reference angle from the AGF and actively works to maintain this optimal angle even as the vehicle experiences changes in velocity, pitch, and heave. The system employs a servo motor with tunable feedback control to achieve this precise angular control, which is helpful for maintaining optimal sensor positioning and minimizing angular overshoot. This continuous adjustment is helpful for the effectiveness of the technology because it ensures the LiDAR sensor maintains its measurement point at a consistent distance ahead of the vehicle, enabling accurate trigonometric calculations and reliable road profile data collection even as the vehicle moves and changes orientation. The AKS's ability to maintain this precise sensor orientation is fundamental to achieving the system's significant road profile accuracy rates and enables the helpful 250-millisecond preview time required for effective active suspension response.

The MCA is a further important subsystem that processes all measured inputs—including velocity, pitch, heave, reference angle, actual sensor angle, and look-ahead measurement distance—to produce accurate road profile measurements by correcting for shifts in the measurement frame-of-reference. The MCA takes these inputs and performs calculations to split the corrected road profile into its vertical height component and longitudinal position relative to the vehicle's front tire contact patch. This correction capability is essential to the invention because it ensures the accuracy of road profile data even as the vehicle's frame of reference constantly changes due to dynamic motion, enabling the system to maintain its demonstrated accuracy rates of 67-88% across varying speeds and conditions. The MCA works in conjunction with the AGF and AKS subsystems, using both the computed reference angle and actual sensor position data to ensure the road profile measurements remain accurate despite the vehicle's dynamic movements, which is helpful for providing reliable input data to active suspension systems within the required 250-millisecond preview window.

The processing unit may employ a model predictive control algorithm based on at least one of the AGF, AKS, and MCA, and combinations thereof, for example, to compute road conditions, while the active suspension controller makes adjustments based on both this real-time and historical data. In particular, the road profile data may be resolved into vertical and longitudinal components by the processing unit. The system also may include a user interface that enables adjustment of suspension sensitivity through user inputs.

The communication interface features wireless capabilities for remote updating of system software and algorithms. The processing unit contains a specialized module that applies polynomial curve fitting to adjust the look-ahead sensor angle based on vehicle speed, which enhances the spatial resolution of road profile measurements. The look-ahead sensor dynamically adjusts its measurement angle in response to speed changes to maintain a constant spatial sampling rate, following the polynomial curve fit relationship.

The active suspension controller utilizes error determination methods, specifically Russel's error measure and Sprague & Geer's error metric, to evaluate road profile measurement accuracy. The processing unit can simulate various road profiles including flat surfaces, speed bumps, and potholes to calibrate system response to different road conditions. A simulation environment within the processing unit enables adjustment of operational parameters of the look-ahead sensor based on real-time vehicle dynamics data to optimize profiling accuracy.

The look-ahead sensor features multi-point LiDAR measurement capabilities for detailed and comprehensive road surface analysis, and is designed to follow a path of the vehicle during turns to enhance profiling accuracy during maneuvers. Multi-point measurement capability of the sensors integrates with existing vehicle camera systems to improve road surface detection reliability. A grid point measurement feature enables better capture and characterization of road profile data that a tire contact patch of the vehicle would encounter.

The capabilities of the system are further expanded through the incorporation of steering wheel input, allowing the look-ahead sensor to track and view the intended tire travel path while the vehicle performs turning or steering maneuvers.

In another embodiment, a vehicle is equipped with an active suspension system that includes the system for enhancing active suspension. This vehicle configuration includes a look-ahead sensor system installed on the vehicle to measure road profiles ahead, a processing unit to compute anticipated road conditions, an active suspension controller to adjust suspension settings preemptively, and a data storage unit to store relevant data. The vehicle is thus capable of dynamically adjusting its suspension in response to real-time road conditions, providing an optimized driving experience that prioritizes safety and comfort.

In certain implementations of the vehicle, the look-ahead road profiling system incorporates a multi-point LiDAR sensor for enhanced sensing capabilities. The processing unit adjusts its computations based on vehicle speed variations, while the active suspension controller utilizes feedback from vehicle motion sensors to fine-tune suspension adjustments. A display unit provides drivers with real-time information about road conditions and suspension settings, and the data storage unit interfaces with external diagnostics tools for maintenance and troubleshooting purposes.

The vehicle performs continuous recalibration using a polynomial curve fit to adjust the measurement angle of the look-ahead sensor relative to vehicle speed, enhancing predictive accuracy of road conditions. The active suspension controller employs specialized algorithms applying Russel's and Sprague & Geer's error metrics to dynamically adjust suspension settings based on road profile data precision. The processing unit can simulate and predict vehicle dynamic response to various standardized road profiles to refine suspension adjustments.

The look-ahead road profiling system of the vehicle automatically adjusts its operational parameters during speed changes to maintain optimal spatial sampling frequency. The active suspension system includes a user interface displaying real-time diagnostics and error metrics related to road profiling and suspension adjustments. Enhanced multi-point LiDAR measurement capabilities enable the creation of detailed three-dimensional maps of the road surface ahead.

The system of the vehicle adjusts its measurement strategy based on vehicle steering input to align road profiling with the intended path of travel. The multi-point LiDAR sensor integrates with vehicle camera systems to form a hybrid sensing unit, providing enhanced road condition data. A grid point measurement mode activates based on specific driving scenarios to improve profiling accuracy. The system dynamically adjusts its operational parameters in real-time during vehicle turning movements to ensure continuous accuracy in road profiling under dynamic driving conditions.

In a further embodiment, a method of using an active suspension enhancement system in a vehicle involves several proactive steps to enhance vehicle performance. These steps include measuring road profiles ahead of the vehicle, computing anticipated road conditions based on these profiles and vehicle dynamics, adjusting suspension settings preemptively based on these computations, storing the measured profiles and adjustments, and updating the system algorithms based on feedback. This method allows for a sophisticated interaction between the systems of the vehicle and the environment of the vehicle, ensuring optimal suspension settings are maintained continuously during operation.

In certain implementations of the method, measuring road profiles involves using a LiDAR sensor to detect road irregularities ahead of the vehicle. The computation of anticipated road conditions incorporates the application of a model predictive control algorithm for enhanced accuracy. The suspension adjustment process of the method utilizes historical road condition data to enhance and optimize current adjustments.

The method includes displaying road condition and suspension setting information to the vehicle driver in real-time through an integrated display system. The algorithms of the system are kept current through wireless updates received remotely, enabling continuous system improvement and optimization.

In an exemplary embodiment, a corrective look-ahead road profiling system (CLARPS) is designed to provide real-time road profile measurements at a fixed spatial sampling rate, tailored for active suspension systems in vehicles. This innovative system incorporates a single-point distance measurement sensor that captures the road surface details, and it integrates existing control strategies to correct for the vehicle's sprung mass motions, focusing on longitudinal velocity, body pitch, and body heave. The system's architecture is based on the vehicle geometric triangle (VGT) model, which simplifies the complex dynamics into manageable parameters for more accurate data processing.

The CLARPS system is structured around three main subsystems: the angle generating function (AGF), the angle keeping system (AKS), and the measurement correction algorithm (MCA). The AGF calculates an optimal look-ahead sensor angle using inputs such as vehicle speed, pitch, and heave, which the AKS then uses to maintain this angle despite the vehicle's movements. The MCA processes these measurements to adjust for any shifts in the measurement frame-of-reference, ensuring the data's accuracy by splitting the corrected road profile into vertical and longitudinal components relative to the vehicle's front tire.

Further enhancements may include expanding the model to incorporate full vehicle dynamics in three dimensions and integrating a grid point measurement system with existing vehicle camera systems to improve the robustness of road surface detection. Additionally, incorporating steering inputs will allow CLARPS to adapt its measurements based on the vehicle's intended path, particularly during turning maneuvers, enhancing its functionality and applicability in real-world scenarios.

Most advantageously, the present technology provides an advanced system for enhancing active suspension in vehicles through predictive road profiling. The system employs a novel combination of sensors and algorithms to accurately predict road irregularities before the vehicle encounters them, allowing for real-time adjustments to optimize vehicle handling, comfort, and safety.

The technology may be particularly advantageous relative to camera-based systems in that it utilizes a single-point or multi-point LiDAR sensor to measure road profiles at a predetermined distance ahead of the vehicle. This data is processed through sophisticated algorithms that account for vehicle dynamics including speed, pitch, and heave to compute anticipated road conditions. The system may also include an inertial measurement unit that is configured to detect vehicle pitch and heave, to be used in conjunction with the LiDAR sensor as a non-limiting example.

The architecture of the present technology is further advantageous in that the AGF calculates an optimal look-ahead sensor angle using vehicle dynamics inputs, which the AKS then maintains despite vehicle movements. The MCA processes these measurements to ensure accuracy by correcting for shifts in the measurement frame-of-reference.

The system has demonstrated promising results in simulation environments, achieving road profile accuracy between 67% and 88%. These encouraging outcomes have led to the development of physical prototypes for further refinement and validation.

Further enhancements to the technology that are contemplated herein include expanding the model to incorporate full vehicle dynamics in three dimensions and integrating a grid point measurement system with existing vehicle camera systems. Additionally, incorporating steering inputs will allow the technology to adapt its measurements based on the intended path of the vehicle, particularly during turning maneuvers.

Importantly, the technology addresses a helpful timing requirement of 250 milliseconds advance notice needed for active suspension systems to respond effectively to road conditions. This preview capability, combined with onboard processing and independence from network connectivity, provides significant advantages over existing active suspension technologies, and particularly those involving cameras.

The system processes all data onboard the vehicle, enabling it to capture both permanent and transient road conditions while maintaining consistent measurement points as the vehicle moves. Recent testing has shown improved performance, with operating frequencies exceeding 50 Hz and road profile accuracy ranging from 64% to 77%.

In particular, the LiDAR technology of the present disclosure provides significant advantages over cameras for active suspension systems due to its superior processing capabilities and precise depth measurements. While cameras can capture road surface images at high acquisition rates, they require substantially more processing time to analyze the full image data. In contrast, single-point measurement approach of LiDAR allows for much faster processing since it only needs to handle individual distance measurements rather than complex image processing of thousands of pixels.

Additionally, LiDAR provides direct and accurate depth information about road surface features, which cameras cannot reliably determine. For example, while cameras can detect the presence of a pothole, they struggle to accurately measure its depth-a helpful parameter for active suspension adjustment. The LiDAR ability to provide precise depth measurements enables more accurate road profiling and subsequent suspension adjustments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a diagram further illustrating the VGT together with body input parameters and measurement parameters for use with the corrective look-ahead road profiling system, vehicle, and method, according to certain embodiments of the present disclosure.

FIG. 15 is a diagram further showing an interpretation of the pothole shown in FIG. 13 by the corrective look-ahead road profiling system, vehicle, and method, according to certain embodiments of the present disclosure.

FIG. 16 is a diagram showing a calculation of the VGT of the corrective look-ahead road profiling system, vehicle, and method in view of the pothole situations shown in FIGS. 14 and 15, according to certain embodiments of the present disclosure.

Figure 17A:
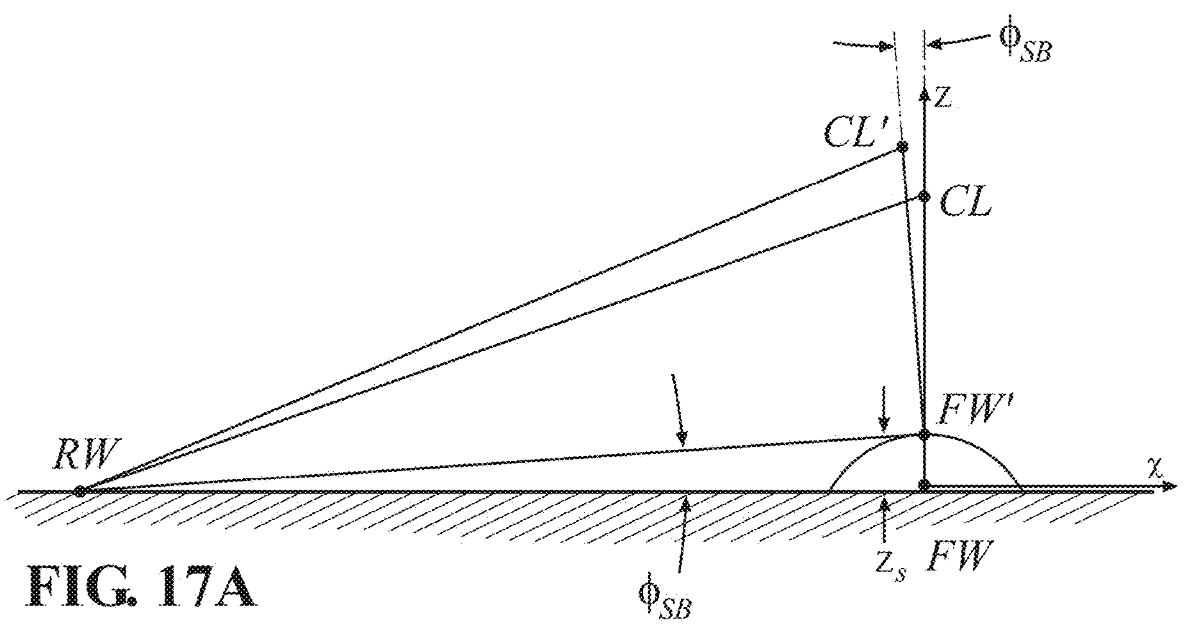
Figure 17B:
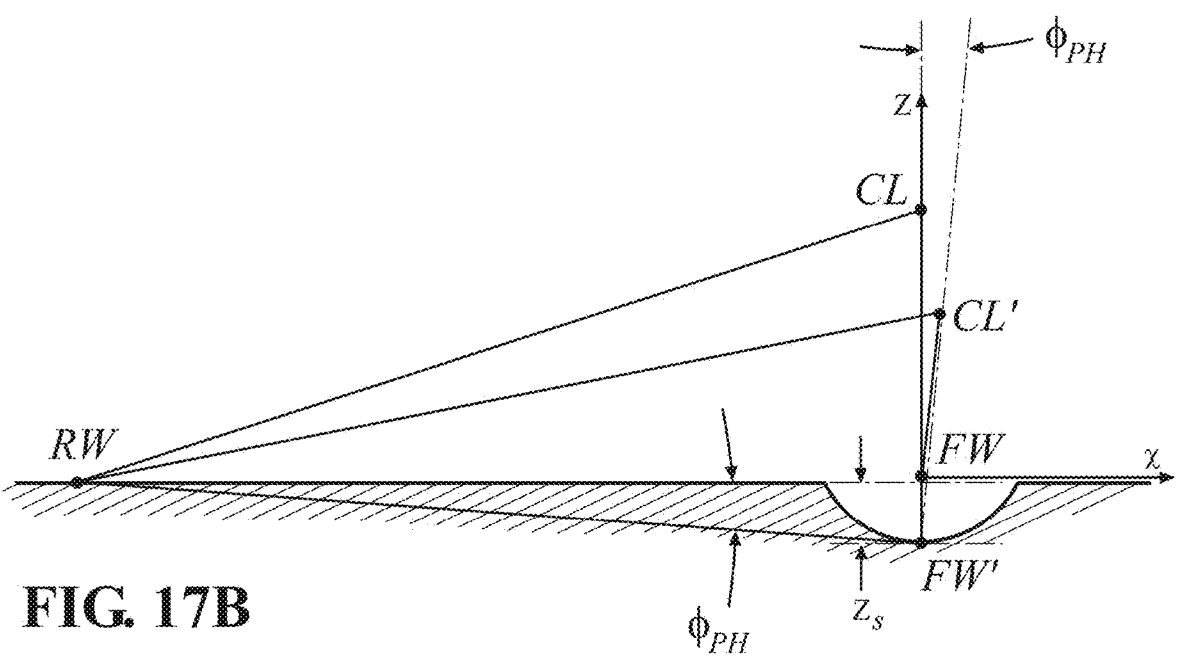
Figure 17C:
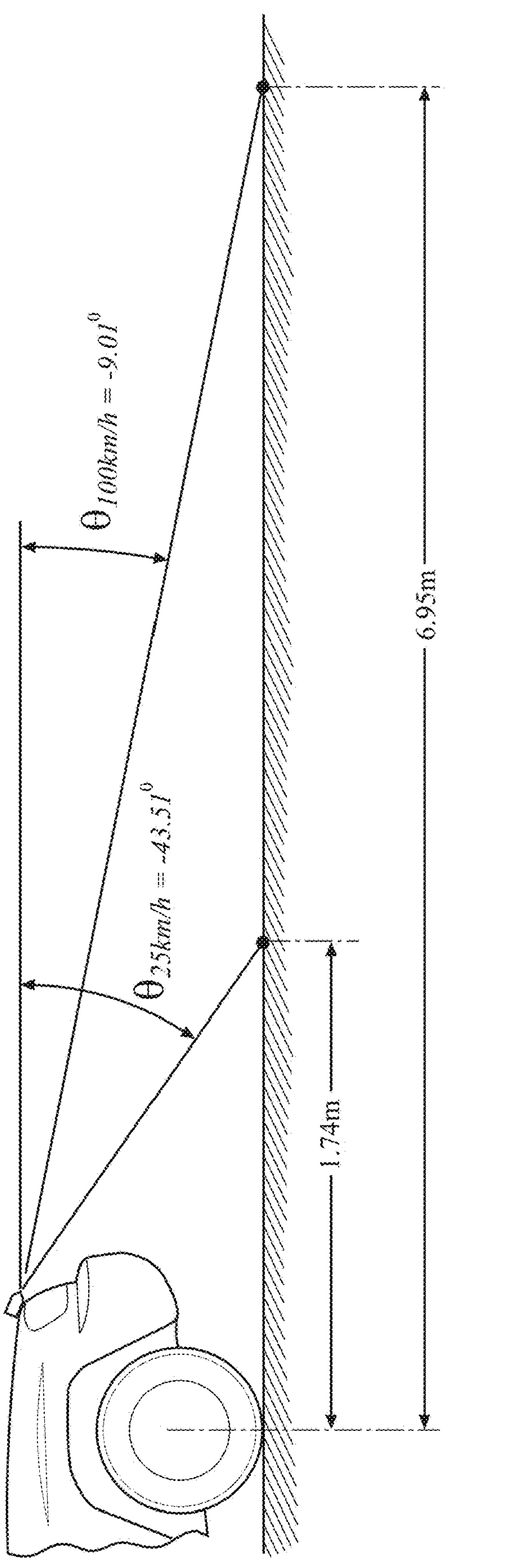

FIGS. 17A-C are diagrams showing a range of look-ahead viewing angles and corresponding distances associated with the corrective look-ahead road profiling system, vehicle, and method, according to certain embodiments of the present disclosure.

Figure 18:
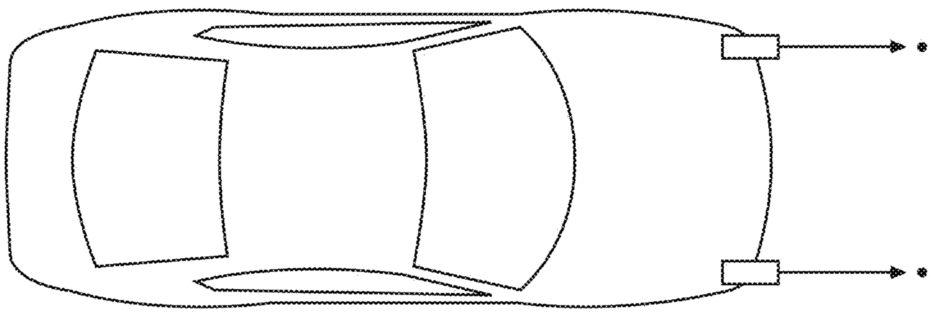

FIG. 18 is a top plan view showing a single-point LIDAR measurement with the corrective look-ahead road profiling system, vehicle, and method, according to certain embodiments of the present disclosure.

Figure 19:
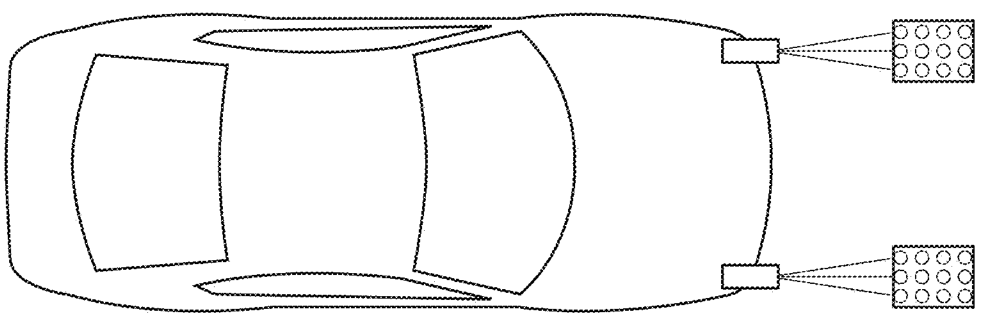

FIG. 19 is a top plan view showing a multi-point LIDAR measurement with the corrective look-ahead road profiling system, vehicle, and method, according to certain embodiments of the present disclosure.

Figure 20:
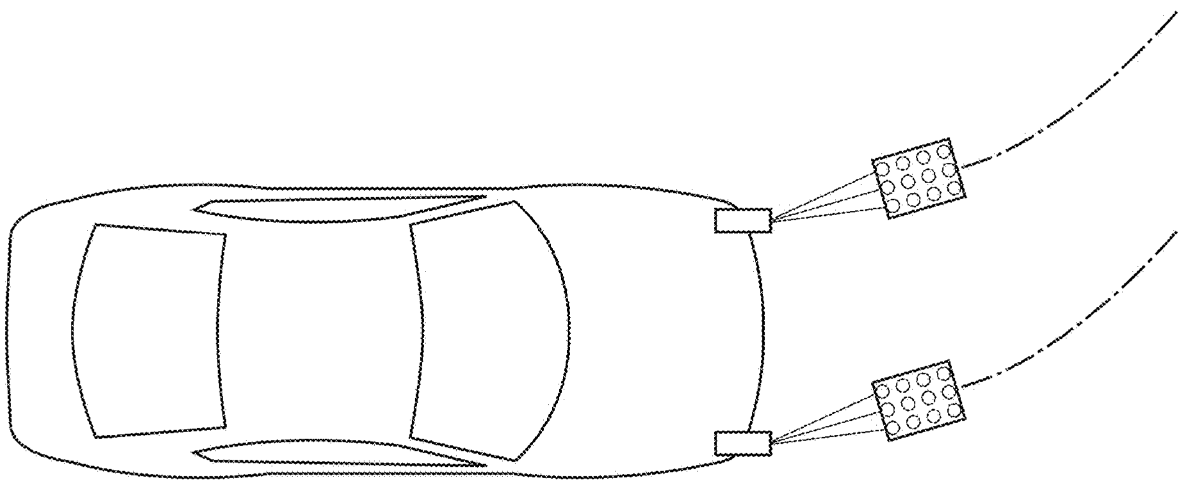

FIG. 20 is a top plan view showing a multi-point LIDAR measurement with the corrective look-ahead road profiling system, vehicle, and method, used together with another detection system, according to certain embodiments of the present disclosure.

Figure 21:
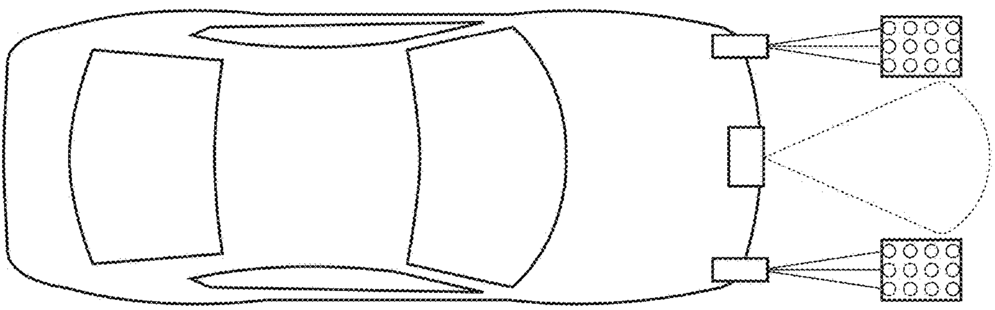

FIG. 21 is a top plan view showing a multi-point LIDAR measurement following the vehicle path while turning with the corrective look-ahead road profiling system, vehicle, and method, used together with another detection system, according to certain embodiments of the present disclosure.

Figure 22A:
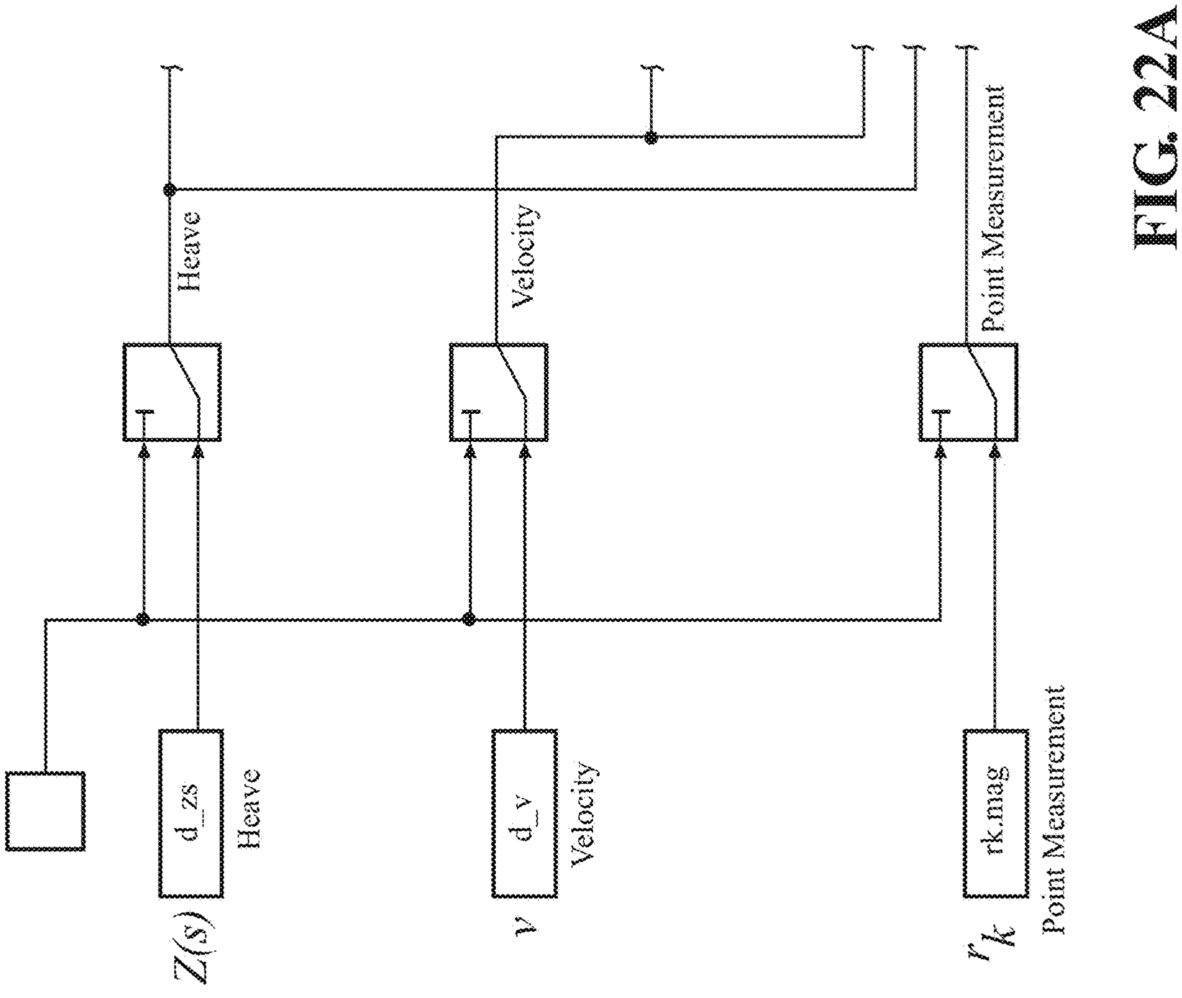
Figure 22B:
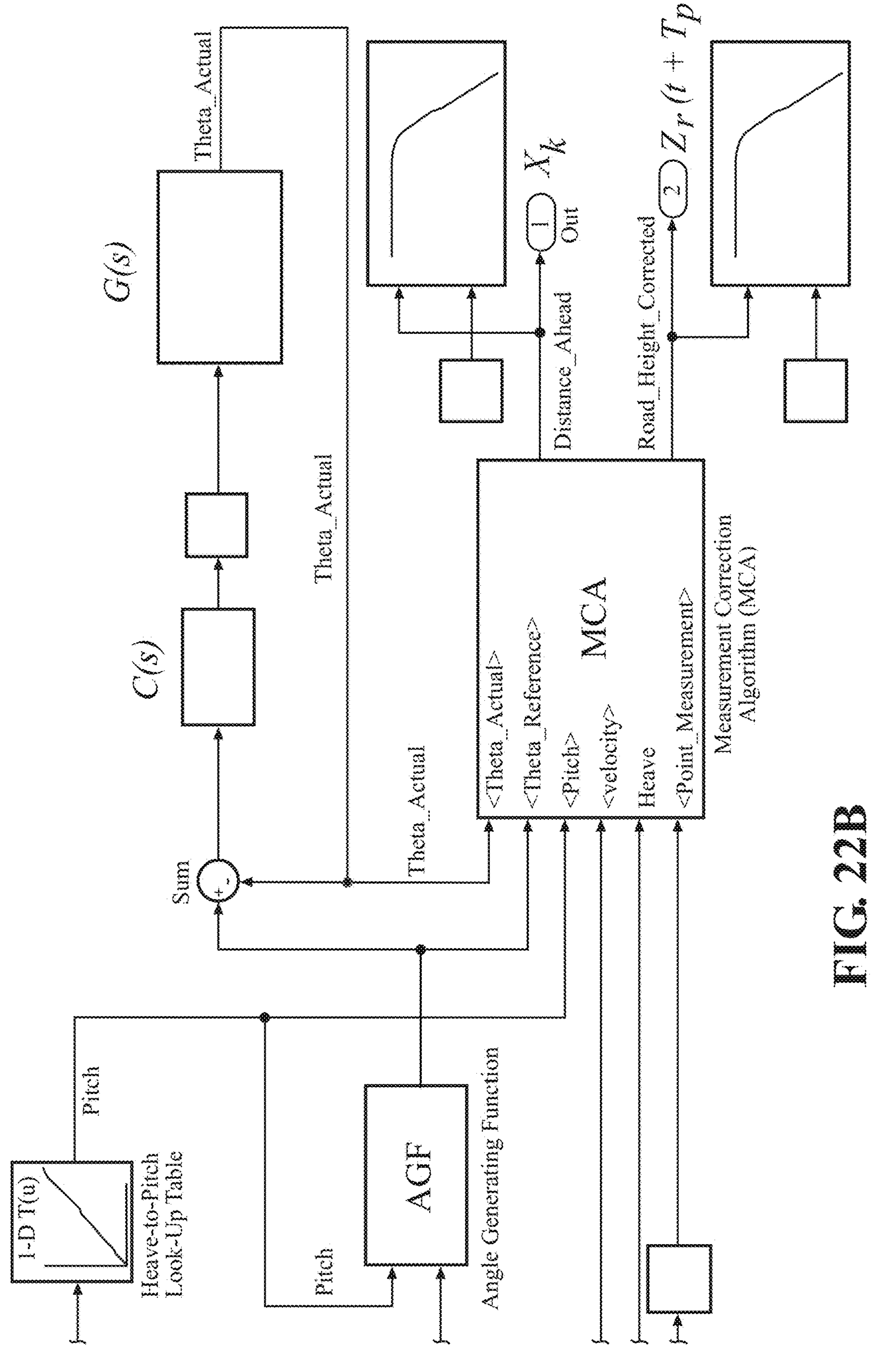

FIGS. 22A and 22B are a schematic diagram view showing the corrective look-ahead road profiling system, vehicle, and method implemented in Simulink, which is a MATLAB-based graphical programming environment for modeling, simulating and analyzing multidomain dynamical systems, with FIG. 22B extending from FIG. 22A, according to certain embodiments of the present disclosure.

Figures 23, 24:
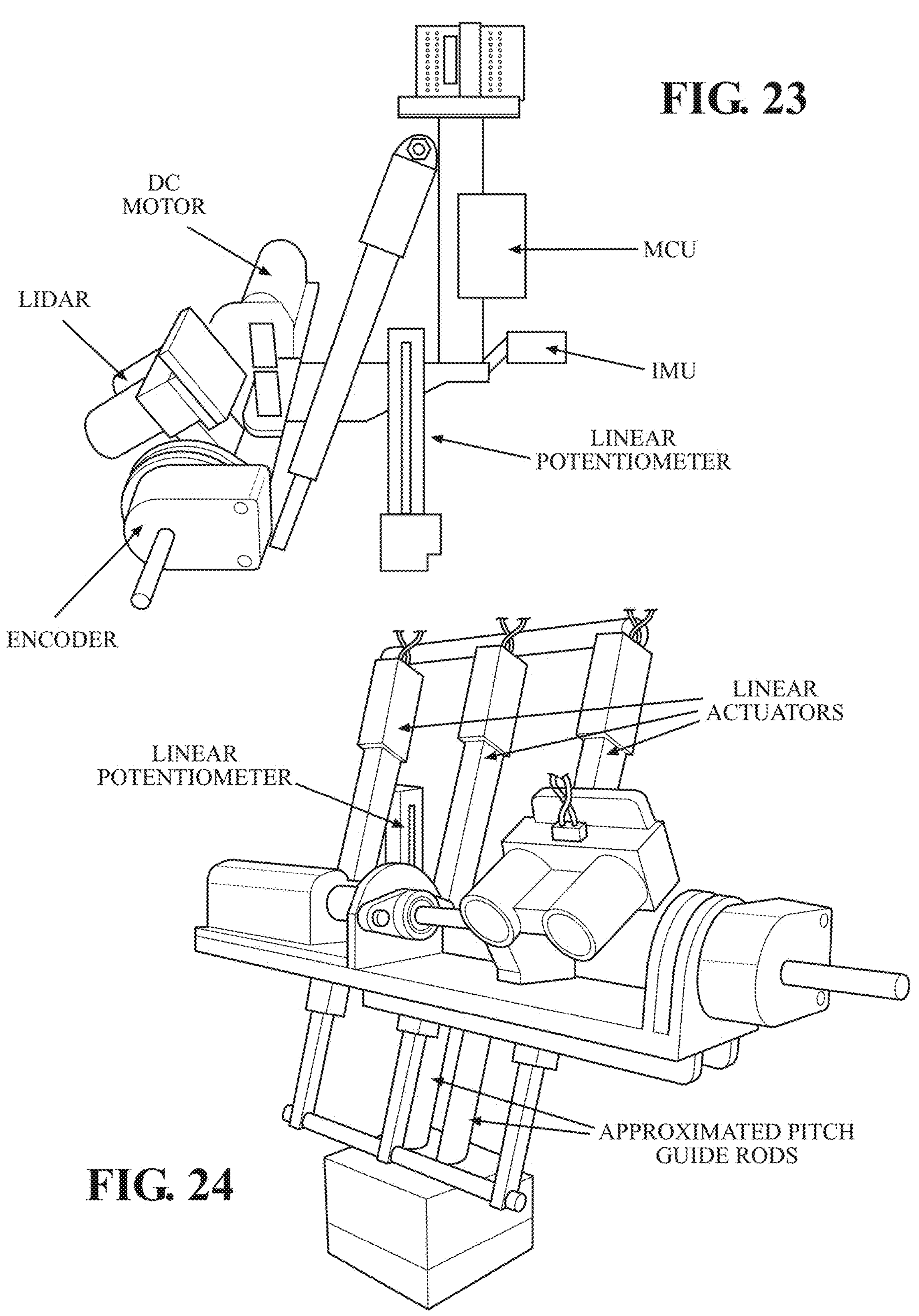

FIG. 23 is a perspective view of the corrective look-ahead road profiling system, vehicle, and method according to a particular embodiment of the disclosure.

FIG. 24 is a perspective view of the corrective look-ahead road profiling system, vehicle, and method being used together with a disturbance generator for testing purposes, according to a particular embodiment of the disclosure.

Figure 25A:
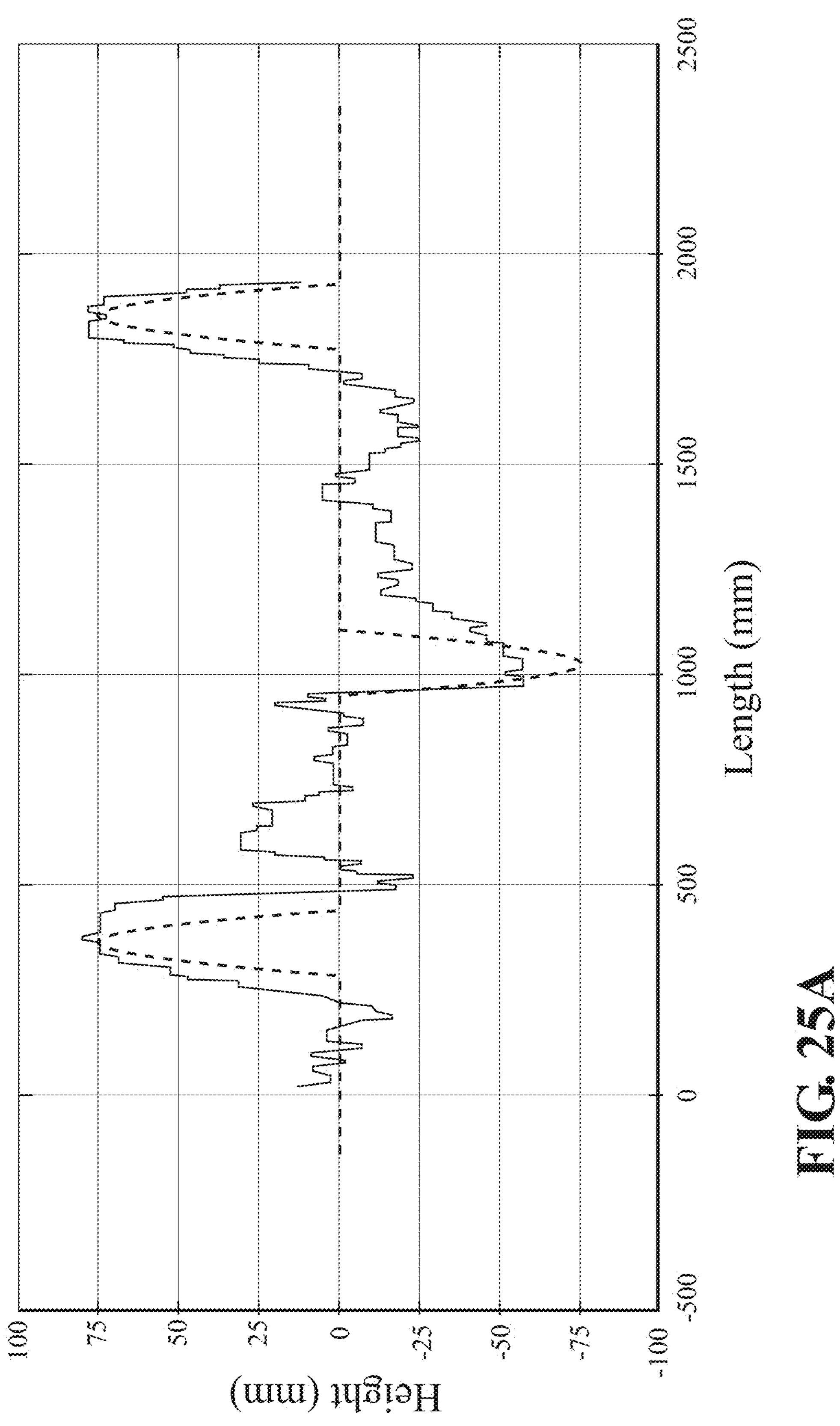

FIG. 25A is a diagram illustrating a real profile (shown with dashed lines) versus acquired profile (shown with solid lines) obtained via the corrective look-ahead road profiling system, vehicle, and method, for a flat road surface, according to certain embodiments of the present disclosure.

Figure 25B:
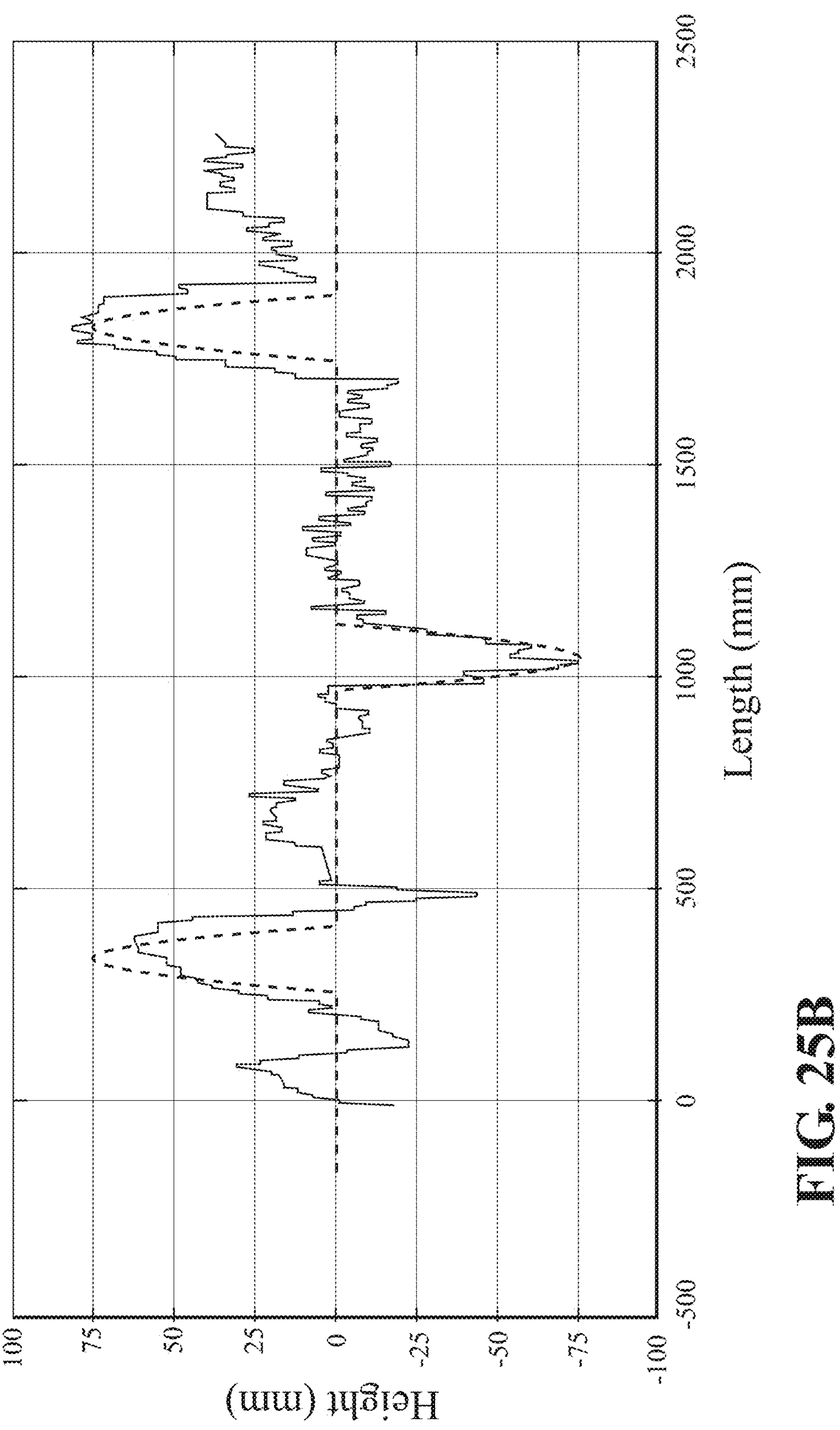

FIG. 25B is a diagram illustrating a real profile (shown with dashed lines) versus an acquired profile (shown with solid lines) obtained via the corrective look-ahead road profiling system, vehicle, and method, for a speed bump on a road surface, according to certain embodiments of the present disclosure.

Figure 25C:
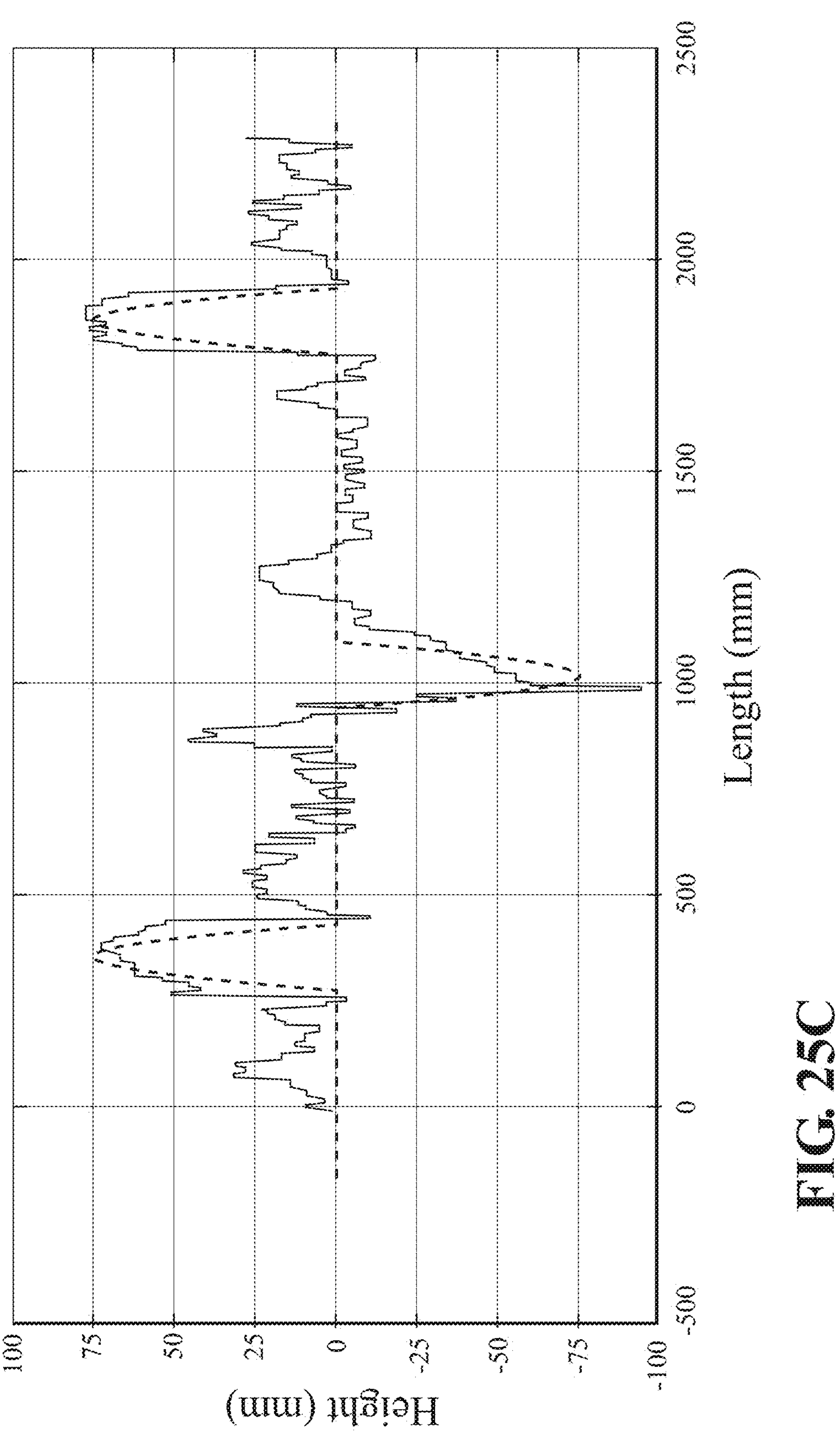

FIG. 25C is a diagram illustrating a real profile (shown with dashed lines) versus an acquired profile (shown with solid lines) obtained via the corrective look-ahead road profiling system, vehicle, and method, for a pothole in a road surface, according to certain embodiments of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology improves the responsiveness and effectiveness of active suspension systems by utilizing advanced predictive algorithms and sensor technologies to accurately forecast road conditions ahead of the vehicle. This allows for preemptive adjustments to the suspension settings, thereby enhancing vehicle stability, comfort, and safety under varying road surfaces and driving conditions.

Figure 1:
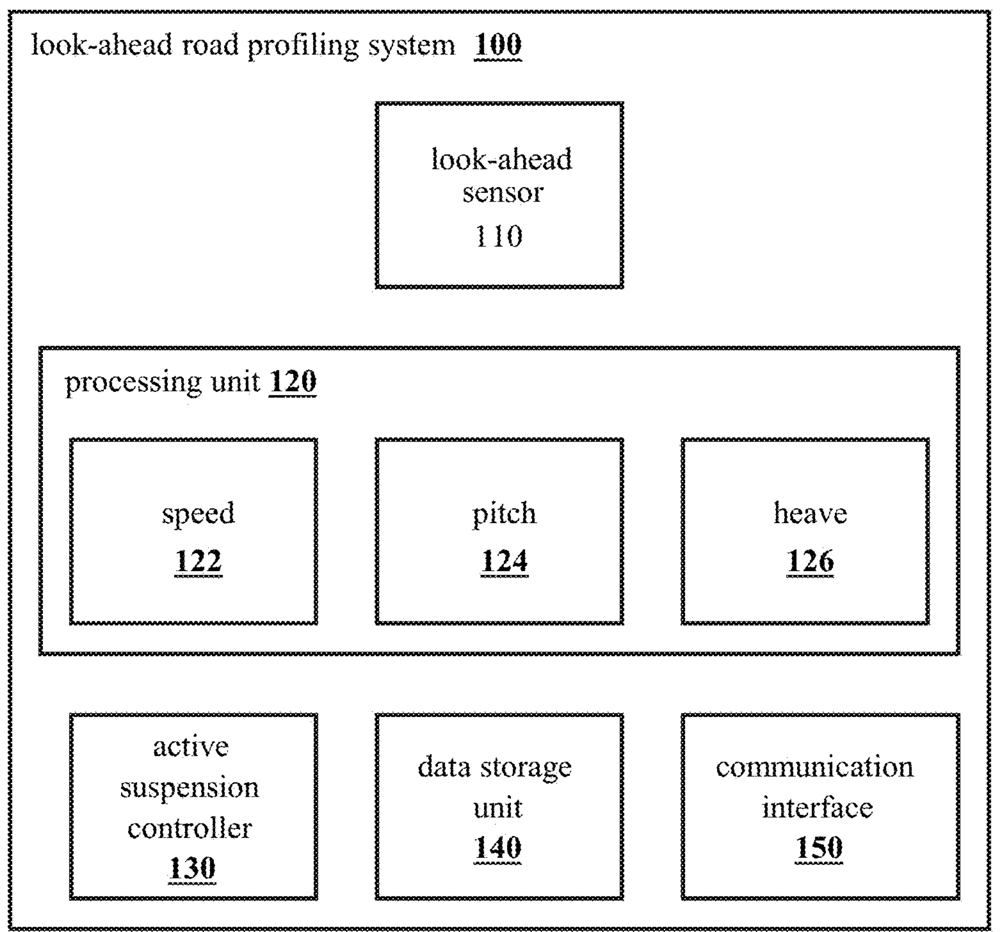
FIG. 1 is a block diagram illustrating a look-ahead road profiling system, according to some embodiments of the present disclosure.

As shown in FIG. 1, the present disclosure relates to a system 100 for enhancing active suspension in vehicles. The system 100 may include a look-ahead sensor 110, a processing unit 120, an active suspension controller 130, a data storage unit 140, and a communication interface 150. These components work in concert to measure road profiles ahead of a vehicle and adjust the vehicle's suspension settings preemptively based on the anticipated road conditions.

The look-ahead sensor 110 of system 100 may be configured to measure road profiles at a predetermined distance ahead of the vehicle. In certain examples, the look-ahead sensor 110 is a sensor that is substantially forward-facing relative to the forward direction of movement of the vehicle to which it is mounted. In one embodiment, the look-ahead sensor 110 may be a LiDAR sensor, which provides high-resolution data on the road surface ahead, allowing for precise measurement of road irregularities. In a further embodiment, the LiDAR sensor measures a single point at a time. In another embodiment, the LiDAR sensors measure an array of points.

The processing unit 120 of system 100 receives data from the look-ahead sensor 110 and computes road conditions based on vehicle dynamics, including speed 122, pitch 124, and heave 126. The processing unit 120 utilizes a model predictive control algorithm to compute the road conditions, optimizing the vehicle's response to upcoming road irregularities.

The active suspension controller 130 of system 100 receives the road conditions computed from the processing unit 120 and adjusts the suspension settings of the vehicle preemptively. This adjustment may be based on both real-time data and historical data stored in the data storage unit 140, allowing for adaptive suspension adjustments that improve ride comfort and vehicle handling.

The data storage unit 140 of system 100 stores historical road condition data and suspension adjustments corresponding with the historical road condition data. This historical data may be used to refine the predictive models in the processing unit 120 and to enhance the responsiveness of the active suspension controller 130.

The communication interface 150 of system 100 facilitates data exchange between the look-ahead sensor 110, the processing unit 120, the active suspension controller 130, and the data storage unit 140. In some embodiments, the communication interface 150 may include wireless communication capabilities to update system software and algorithms remotely, ensuring that system 100 remains at the cutting edge of technology. Further, the communication interface 150 may provide a sequential buffer of corrected road height and position data for predictive actuation.

It should be appreciated that each component of the system described in the disclosure may be equipped with processors and memories that store tangible, non-transitory processor-executable instructions. These instructions enable the modules to perform various steps of the method as outlined in the disclosure, facilitating a sophisticated, computer-implemented operation within the vehicle's systems.

For example, the processing unit 120 may act as a central computing module within system 100. It is equipped with a memory and a processor that store and execute, respectively, a model predictive control algorithm. This algorithm processes data received from the look-ahead sensor 110, which includes parameters like speed 122, pitch 124, and heave 126, to compute road conditions. This computation is helpful for optimizing the vehicle's response to detected road irregularities, making real-time adjustments based on dynamic vehicle data.

As a further example, the active suspension controller 130, another helpful module, also contains a processor and memory where instructions for adjusting suspension settings are stored and executed. These adjustments may be based on the road conditions computed by the processing unit 120. The controller leverages both real-time and historical data from the data storage unit 140, enabling adaptive suspension adjustments that enhance ride comfort and handling. This makes the active suspension controller a dynamic response module within the system.

As yet another example, the data storage unit 140 may serve as a repository module within system 100, equipped with memory to store historical road condition data and corresponding suspension adjustments. This historical data is helpful for refining the predictive models used by the processing unit 120 and for enhancing the operational efficiency of the active suspension controller 130. By storing past data, the unit supports a learning mechanism that progressively improves system performance.

In yet another example, the communication interface 150 functions as a communication module that facilitates data exchange among all the aforementioned components. It includes processors and memory that manage and execute software necessary for both wired and wireless communication. This capability is essential for updating system software and algorithms remotely, ensuring that the vehicle's system remains updated with the latest technological advancements. This module not only supports internal system communication but also enables integration with external networks for updates and data synchronization, reinforcing the system's adaptability and future-proof.

With continued reference to FIG. 1, the processing unit 120 may further comprise a module configured to apply a polynomial curve fit to adjust an angle of the look-ahead sensor 110 based on vehicle speed, enhancing the spatial resolution of road profile measurements. This adjustment allows the look-ahead sensor 110 to dynamically change its measurement angle in response to changes in vehicle speed to maintain a constant spatial sampling rate. Although a polynomial curve fit is described herein as being a particularly suitable type of curve fit to employ, one skilled in the art may also select other curve fit types or methodologies within the scope of the present disclosure, as desired.

The active suspension controller 130 may be configured to utilize error determination methods such as Russel's error measure and Sprague & Geer's error metric to evaluate the accuracy of road profile measurements. Examples include those described by C. J. Kat and P. S. Els, "Validation metric based on relative error," Mathematical and Computer Modelling of Dynamical Systems, vol. 18, no. 5, pp. 487-520, 2012. These metrics, as depicted for example in TABLE 1 below, help ensure that the adjustments made to the suspension settings may be both precise and beneficial to vehicle performance.

$$C_R = \sqrt{\frac{\pi}{4}\left(M_R^2 - P_R^2\right)}$$

Russel's Comprehensive Error $$C_{S\&G} = \sqrt{\left(M_{S\&G}^2 + P_{S\&G}^2\right)}$$

Sprague & Geer's Comprehensive Error

TABLE 1

| Velocity Case | Russell's Comprehensive Error [%] | S&G's Comprehensive Error [%] |
|---|---|---|
| 1. Slow Speed | 12.40 | 15.37 |
| 2. MediumSpeed | 23.71 | 26.79 |
| 3. FastSpeed | 31.28 | 36.77 |

The CLARPS system has demonstrated promising results in simulation environments, showing road profile accuracy between 67% and 88%. These encouraging outcomes have led to the development of a physical prototype to further refine and validate the system's capabilities.

The processing unit 120 may be also configured to simulate different road profiles such as flat, speed bump, and pothole profiles to calibrate the response of system 100 to varied road conditions. This simulation environment helps in adjusting operational parameters of the look-ahead sensor 110 based on real-time vehicle dynamics data to optimize road profiling accuracy.

The look-ahead sensor 110 may include capabilities for multi-point LiDAR measurement, allowing for a more detailed and comprehensive road surface analysis. This capability enhances the system's ability to accurately profile complex road geometries and to adjust the vehicle's suspension settings more effectively.

The look-ahead sensor 110 may be further configured to follow the path of the vehicle while turning, enhancing road profiling accuracy during vehicle maneuvers. This feature ensures that the sensor accurately tracks the road surface even when the vehicle may be changing direction, providing reliable data to the processing unit 120.

A multi-point measurement capability of the look-ahead sensor 110 may be integrated with existing camera systems on the vehicle to increase the robustness of road surface detection. This integration allows system 100 to leverage both LiDAR and camera data for a more comprehensive understanding of the road conditions ahead.

The look-ahead sensor 110 may include a grid point measurement feature to better capture and characterize road profile data that a tire contact patch of the vehicle would encounter. This feature allows for a more granular analysis of the road surface, providing detailed data to the processing unit 120 for processing.

The look-ahead sensor 110 may be configured to expand its capability by incorporating steering wheel input to track and view an intended tire travel path, obtaining road profile data while the vehicle may be performing a turning or steering maneuver. This capability allows the system 100 to anticipate changes in the road surface that correlate with the vehicle's intended path, enhancing the predictive accuracy of the system.

Figure 2:
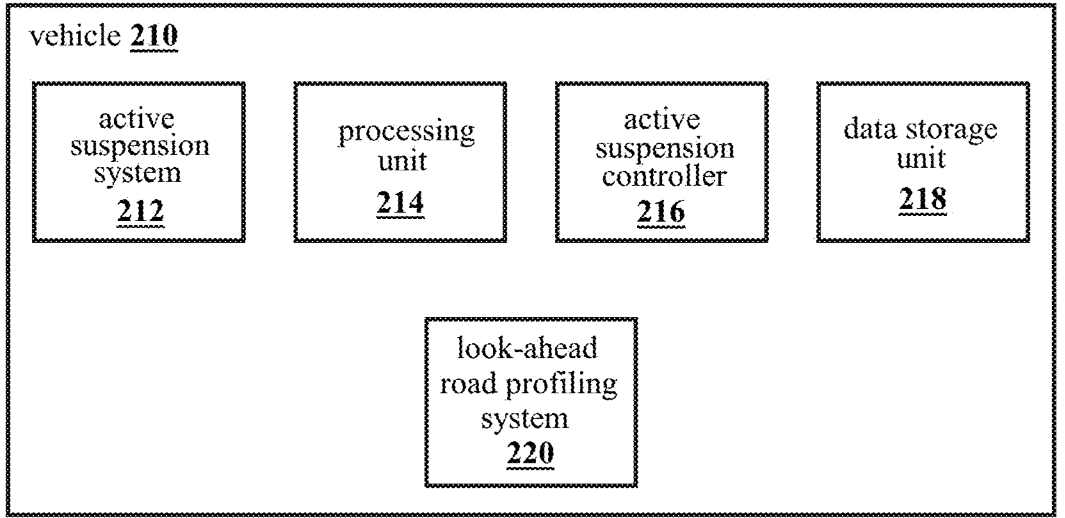
FIG. 2 is a block diagram illustrating a vehicle having the look-ahead road profiling system of FIG. 1, according to some embodiments of the present disclosure.

As shown in FIG. 2, a vehicle 210 comprises an active suspension system and may include the system 100 for enhancing active suspension. The vehicle 210 may be equipped with the look-ahead sensor system installed on the vehicle and configured to measure road profiles ahead of the vehicle, providing essential data for proactive suspension adjustments.

The processing unit installed on vehicle 210 computes anticipated road conditions from data received from the look-ahead sensor. This unit adjusts computations based on vehicle speed variations, ensuring that the predictive models may be accurate and reflective of the current driving conditions.

The active suspension controller integrated with the active suspension system of vehicle 210 receives computed road conditions and adjusts suspension settings of vehicle 210 preemptively. This integration allows for seamless communication between the sensor system and the suspension controller, facilitating real-time adjustments that enhance vehicle stability and comfort.

A data storage unit integrated with vehicle 210 stores road condition data and the suspension settings corresponding with the road condition data. This integration ensures that all relevant data may be readily available for processing and analysis, enhancing the overall functionality of the active suspension system.

The vehicle 210 further may include a display unit configured to provide the driver with real-time information about road conditions and suspension settings. This feature allows the driver to be fully informed about the vehicle's performance and the conditions of the road ahead, enhancing driving safety and comfort.

Figure 3:
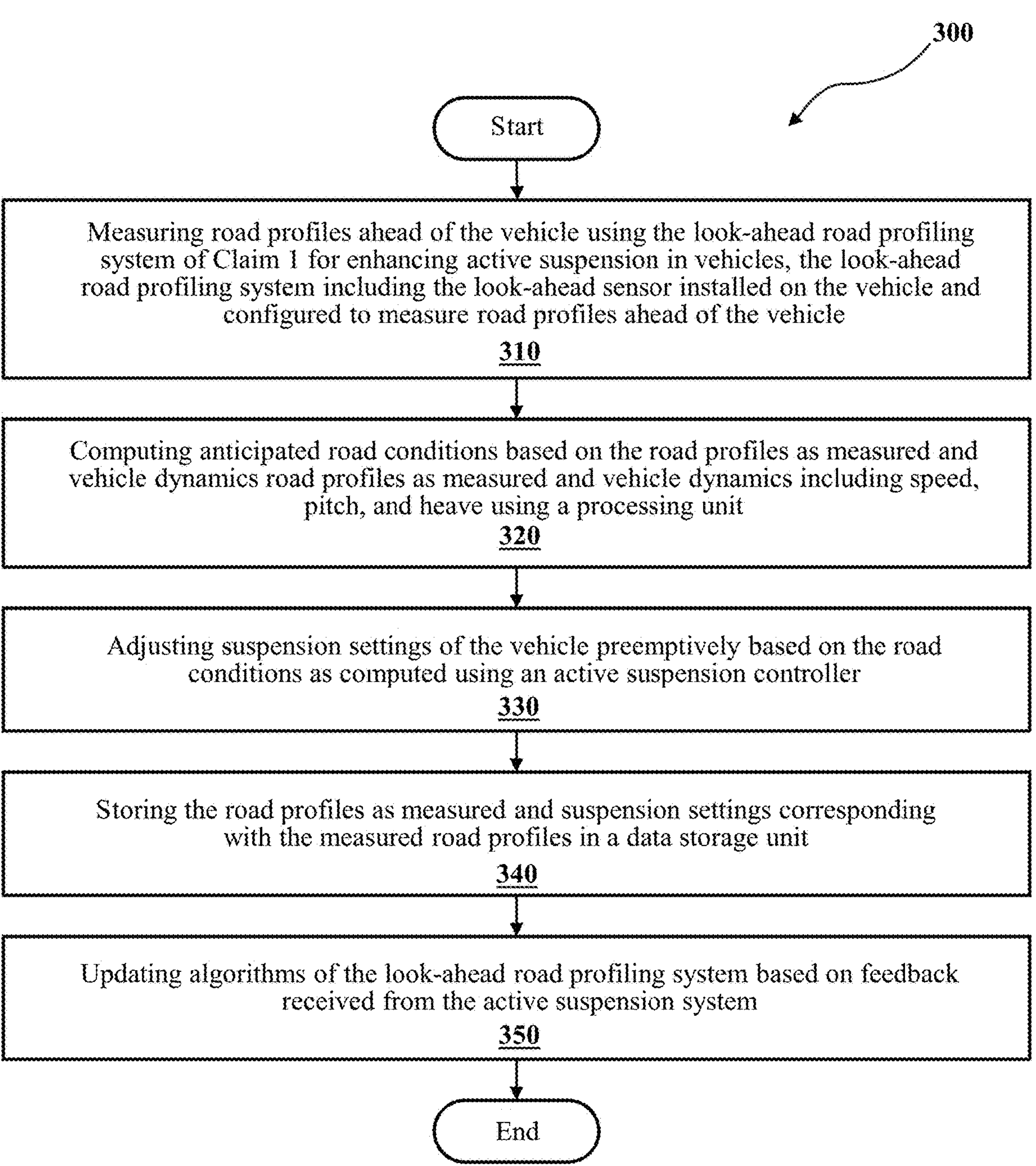
FIG. 3 is a flowchart illustrating a method of using an active suspension enhancement system in a vehicle with the look-ahead road profiling system of FIG. 1, according to some embodiments of the present disclosure.

As shown in FIG. 3, the method 300 of using an active suspension enhancement system in a vehicle involves several steps 310 to 350, as non-limiting examples.

In step 310 of method 300, road profiles may be measured ahead of the vehicle using the look-ahead sensor 110. This sensor, which may be a LiDAR sensor, captures detailed topographical data of the road surface, including bumps, potholes, and other irregularities that could affect ride quality. The accuracy and precision of the look-ahead sensor 110 may be important, as they directly influence the effectiveness of the subsequent processing and suspension adjustment steps.

Step 320 involves computing anticipated road conditions based on the road profiles measured in step 310, along with vehicle dynamics data such as speed 122, pitch 124, and heave 126. The processing unit 120 utilizes advanced algorithms, potentially including model predictive control, to analyze this data and predict how these conditions will affect the ride of the vehicle. This step enables preemptive adjustment of the suspension settings to optimize both safety and comfort before the vehicle encounters the predicted road conditions.

In step 330, the active suspension controller 130 adjusts the vehicle's suspension settings preemptively based on the computed road conditions from step 320. This involves modifying the stiffness and damping characteristics of the suspension system to better handle the anticipated road irregularities. The ability to adjust these settings in real-time may be a feature of the system 100, allowing it to enhance the vehicle's stability and passenger comfort dynamically as driving conditions change.

Step 340 entails storing the road profiles measured and the corresponding suspension settings adjusted in previous steps within the data storage unit 140. This historical data may be useful for refining the system's predictive models and for troubleshooting purposes. By analyzing this data, the system can learn from past experiences, continuously improving its accuracy and reliability in predicting and responding to road conditions.

Finally, step 350 involves updating the algorithms of the look-ahead road profiling system 100 based on feedback received from the active suspension system. This step ensures that the system remains effective over time, adapting to new data and evolving road conditions. Updates may include algorithm tweaks to improve prediction accuracy or adjustments to the sensor calibration to maintain measurement precision. This continuous improvement cycle may be vital for maintaining the high performance of the system in varying operational environments.

Advantageously, the system, vehicle, and method of the present disclosure provides preview information specific to each vehicle and its traveled path. Providing active suspension specific information allows for the most robust and reliable implementation of active suspension. This means that the system will compute and transmit its acquired information onboard the vehicle. The system has the added benefit that it would be able to capture road profile data pertaining to changing road conditions (e.g. the system could capture transient phenomenon present on the road surface such as fallen 2"×4" pieces of wood within the vehicle's travel path).

Further advantageously, the system, vehicle, and method of the present disclosure, sometimes referred to as the CLARPS, addresses the significant limitations of prior art in active suspension systems by providing a real-time, accurate road profiling capability that does not rely on pre-coded road data or network connectivity. Unlike traditional systems that struggle with computational complexity and the inability to adapt to dynamic vehicle movements and varying road conditions, CLARPS utilizes an innovative combination of a single-point LiDAR sensor, AGF, AKS, and MCA. These components work synergistically to adjust the angle of the sensor based on vehicle dynamics and correct any deviations in the measurement frame of reference, ensuring high-resolution road profiling. This system not only enhances the performance of active suspension systems but also ensures a more comfortable and safer driving experience by proactively adjusting to road irregularities in real-time.

It should also be appreciated that previous efforts by original equipment manufacturers (OEMs) have primarily utilized existing vehicle cameras designed for Advanced Driver-Assistance Systems (ADAS). In contrast, the CLARPS may employ a single-point LiDAR, enhancing the accuracy and reliability of data collection. Further iterations of CLARPS may explore the use of both single-point and multi-point LiDAR, or a hybrid approach combining LiDAR with traditional camera data.

Known technologies have primarily focused on developing actuation control for active suspension systems, often using pre-defined, hard-coded road profiles or GPS-scanned data. These methods, while useful, depend heavily on network connectivity and are typically limited to controlled environments like automotive proving grounds. Some studies hint at live road profiling, but these methods are often proprietary and not widely disclosed.

A major challenge in road profiling is the ability to adapt to constant shifts in the vehicle's measurement frame of reference. CLARPS addresses this by actively monitoring and adjusting to changes in the vehicle's body dynamics, which affect this frame of reference. It then applies corrective offsets to the measurements, ensuring the acquisition of accurate, real-time road profile data. This data is helpful for the active suspension system, providing tailored adjustments based on the specific vehicle and its current path, a novel approach in vehicle-specific dynamic adaptation.

EXAMPLES

Example embodiments of the present technology are provided with reference to the additional figures (FIGS. 4-31) enclosed herewith.

Corrective Look-Ahead Road Profiling System (CLARPS)

Figure 4:
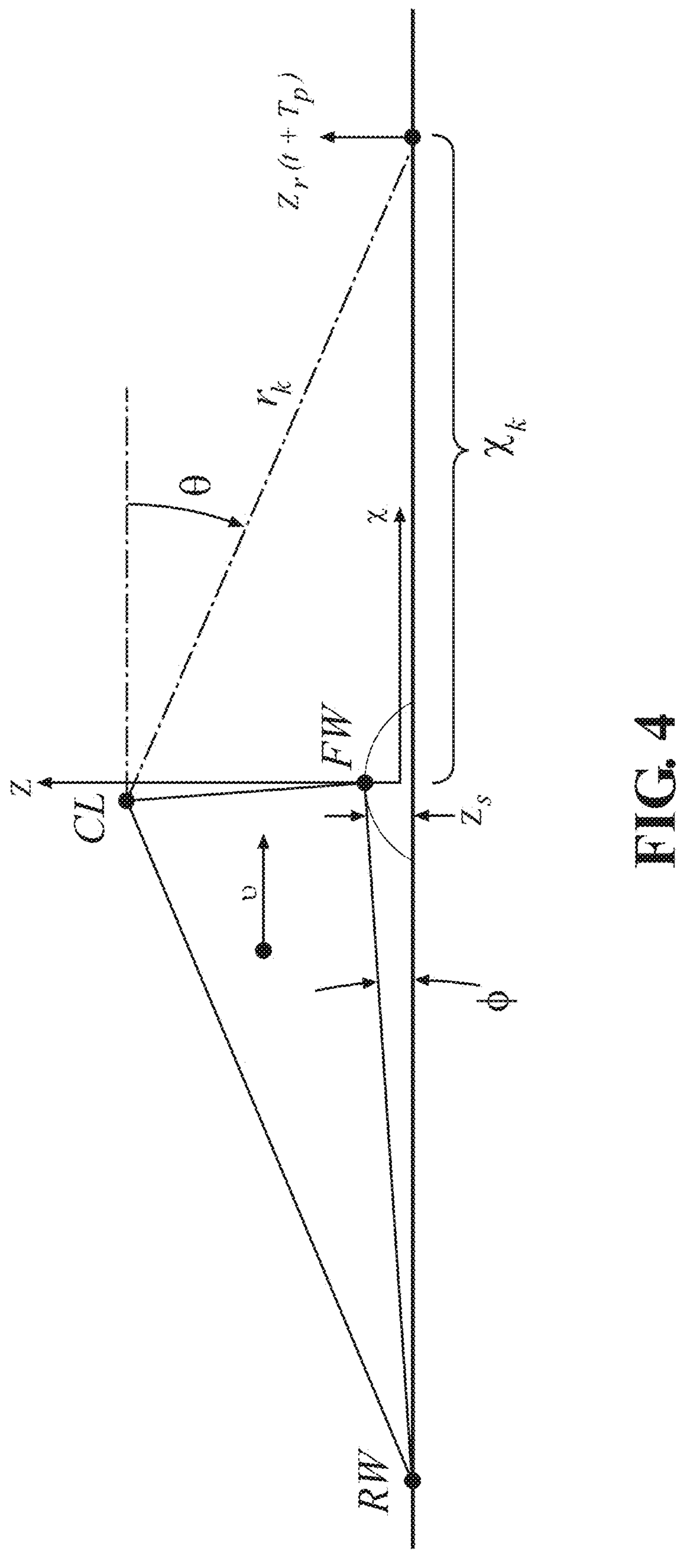
FIG. 4 is a diagram illustrating a vehicle geometric triangle (VGT) model that may be used to characterize the corrective look-ahead road profiling system, vehicle, and method, according to certain embodiments of the present disclosure.
Figure 5:
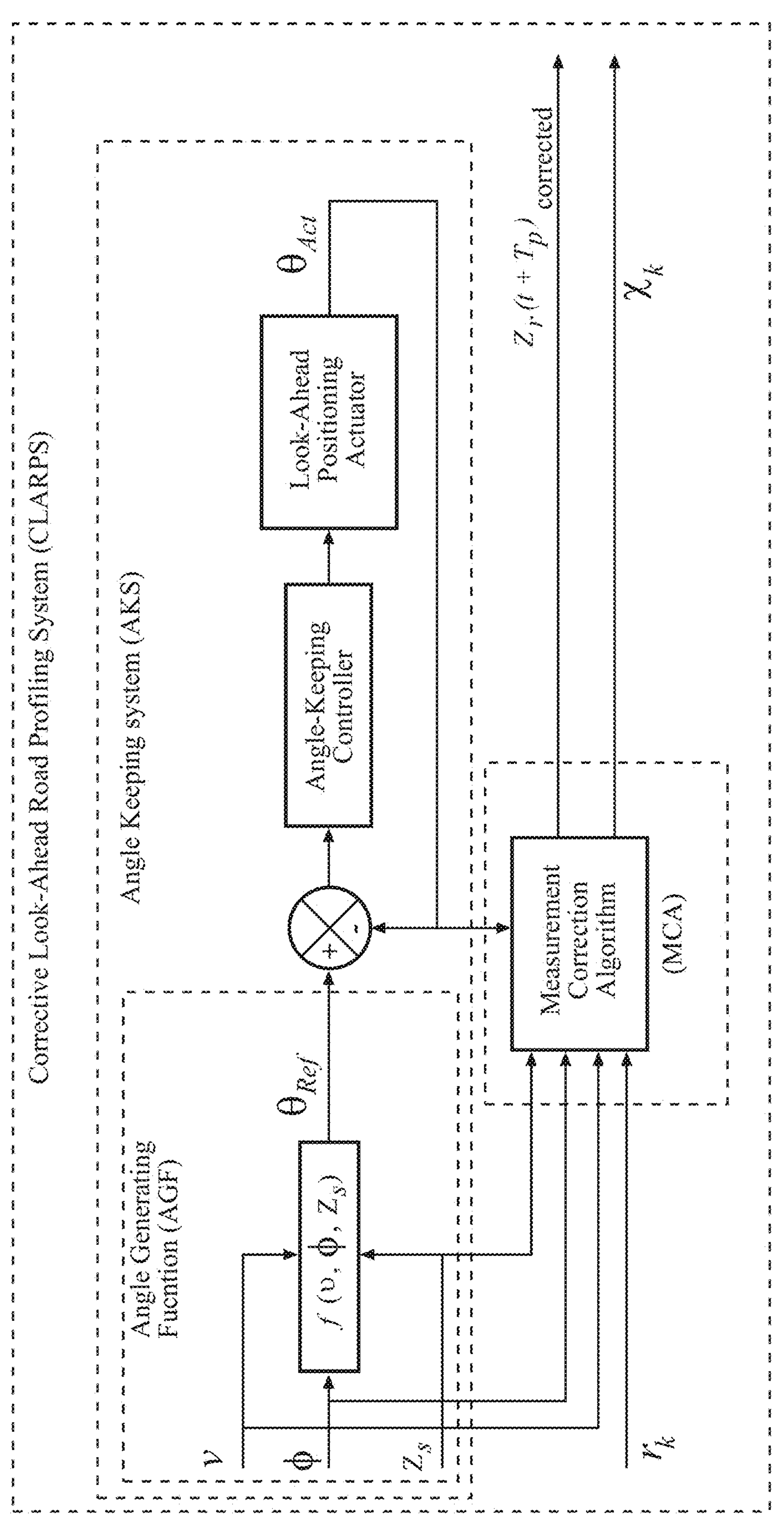
FIG. 5 is a schematic diagram illustrating a control logic block architecture of the corrective look-ahead road profiling system, vehicle, and method, according to certain embodiments of the present disclosure.
Figure 6A:
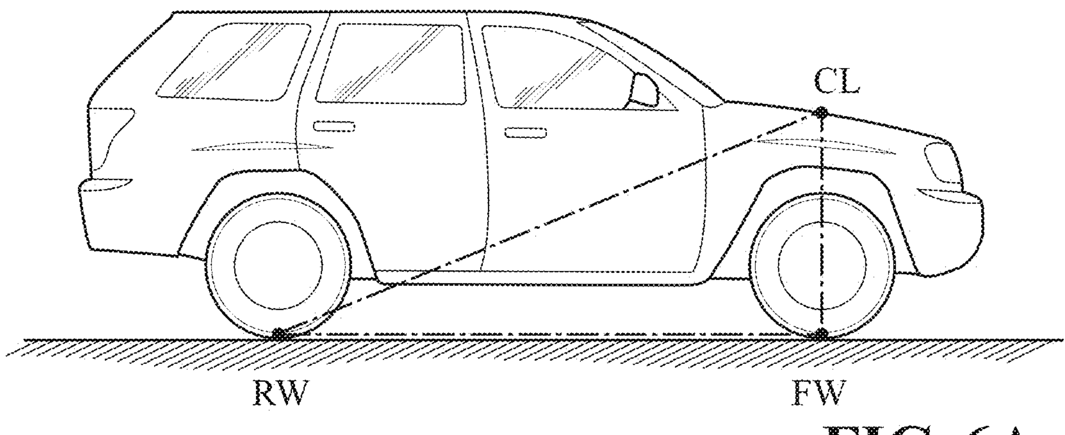
FIG. 6A is a side elevational view of a headlight position arrangement for installation of the VGT in the corrective look-ahead road profiling system, vehicle, and method, according to certain embodiments of the present disclosure.
Figure 6B:
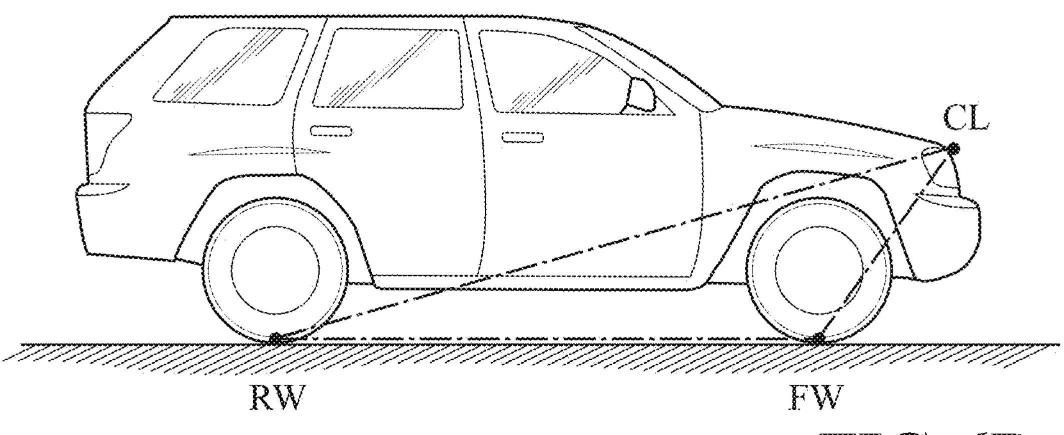
FIG. 6B is a side elevational view of a side-view mirror mounted position arrangement for installation of the VGT in the corrective look-ahead road profiling system, vehicle, and method, according to certain embodiments of the present disclosure.
Figure 6C:
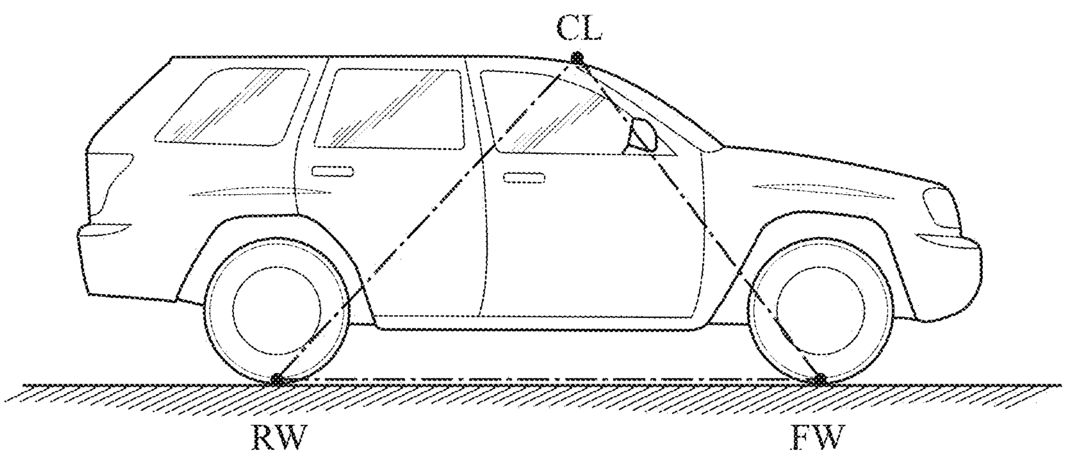
FIG. 6C is a side elevational view of a roof mounted position arrangement for installation of the VGT in the corrective look-ahead road profiling system, vehicle, and method, according to certain embodiments of the present disclosure.
Figure 7A:
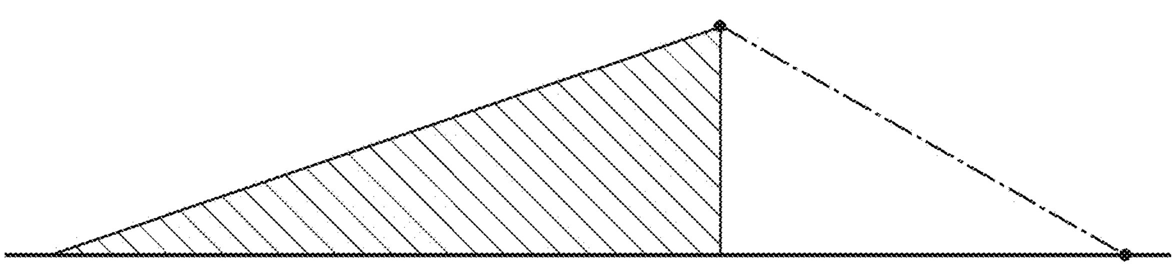
FIG. 7A is a diagram showing a resultant LiDAR atmospheric sounder and altimeter (LASA) for the headlight position arrangement for installation of the VGT shown in FIG. 6A, according to certain embodiments of the present disclosure.
Figure 7B:
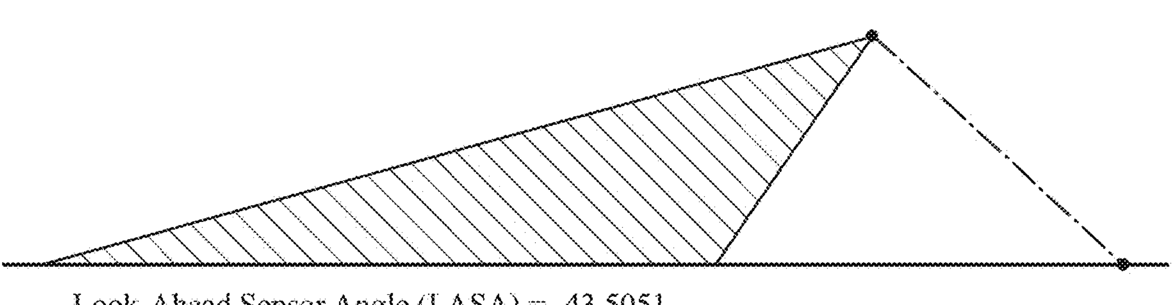
FIG. 7B is a diagram showing a resultant LASA for the side-view mirror mounted position arrangement for installation of the VGT shown in FIG. 6B, according to certain embodiments of the present disclosure.
Figure 7C:
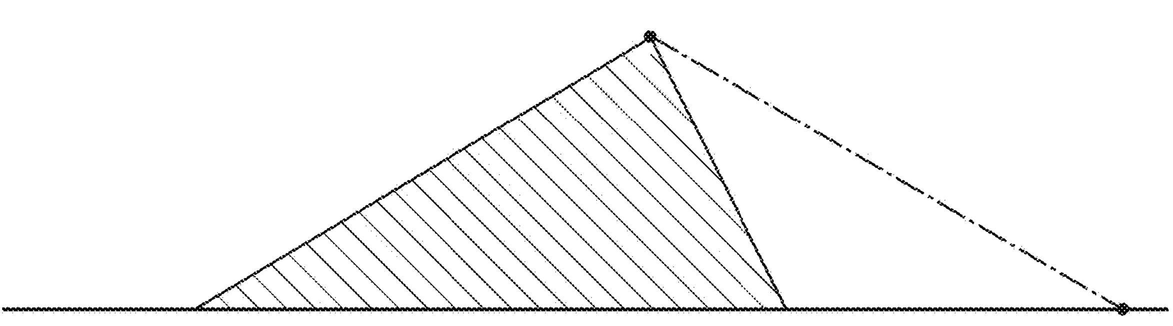
FIG. 7C is a diagram showing a resultant LASA for the roof mounted position arrangement for installation of the VGT shown in FIG. 6C, according to certain embodiments of the present disclosure.
Figure 8:
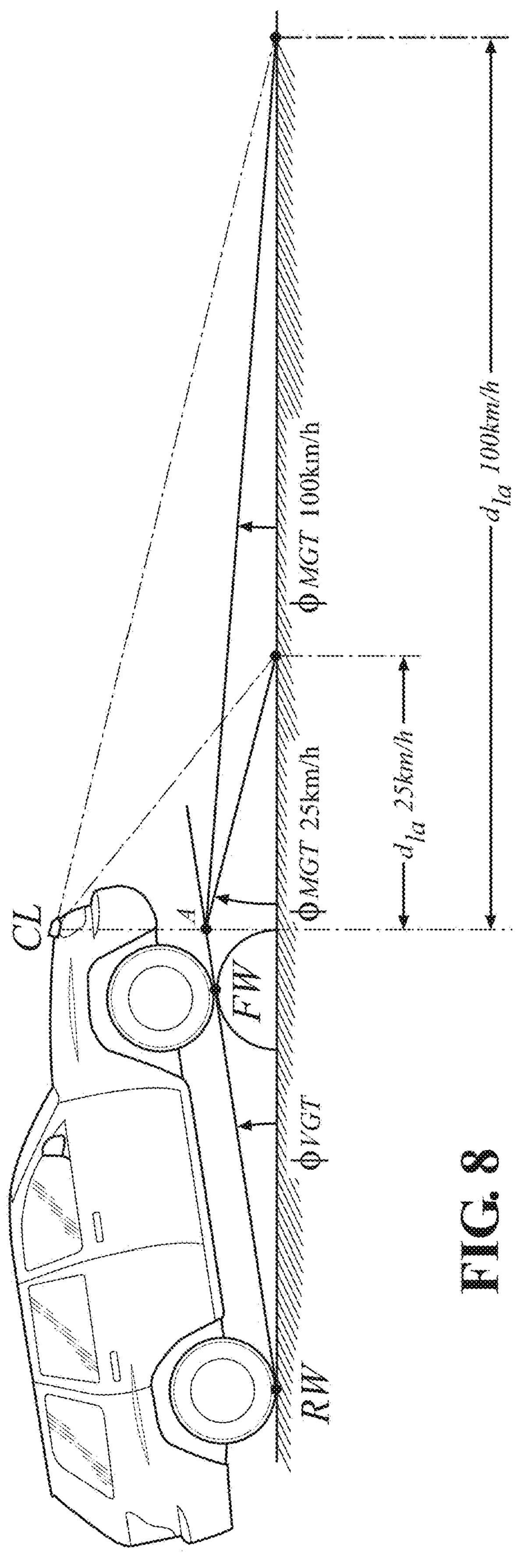
FIG. 8 is a side elevational view of the corrective look-ahead road profiling system, vehicle, and method, showing a visual representation of how pitch induced on the VGT results in a different pitch induced on the measurement geometric triangle (MGT) at different speeds.
Figure 10:
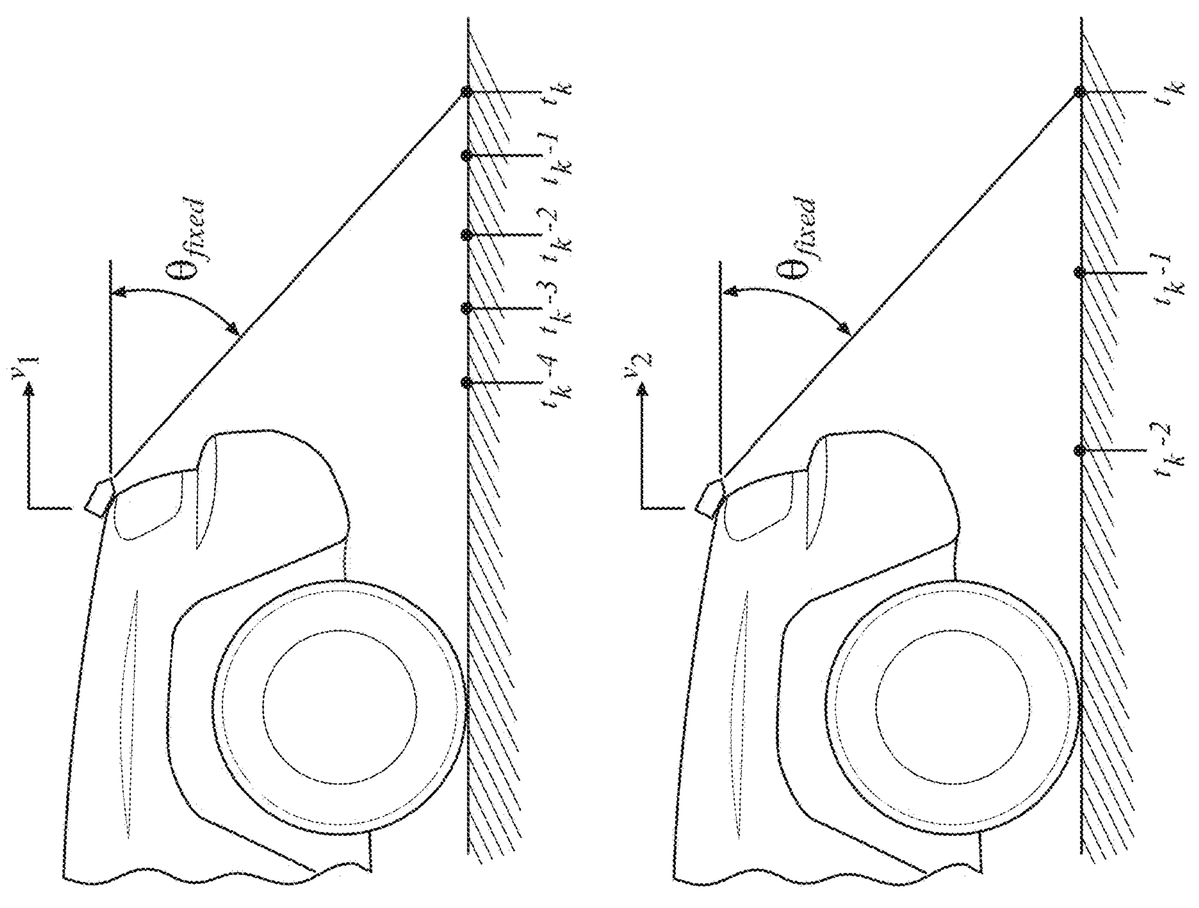
FIG. 10 is a diagram further showing an application of the VGT calculation together the body input parameters and measurement parameters set forth in FIG. 9, according to certain embodiments of the present disclosure.
Figure 11:
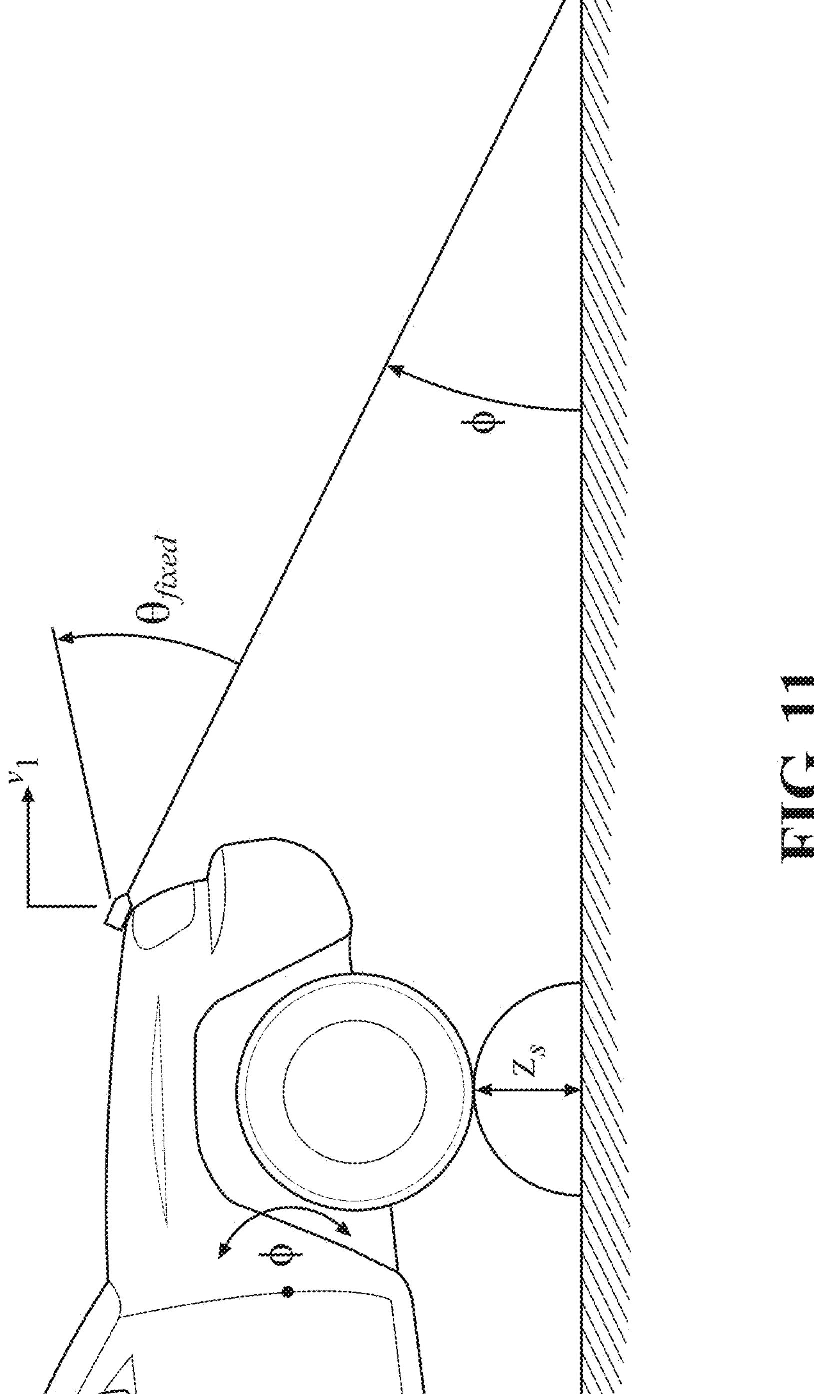
FIG. 11 is a diagram further showing vehicle travel over a speedbump on a road surface with use of the corrective look-ahead road profiling system, vehicle, and method, according to certain embodiments of the present disclosure.
Figure 12:
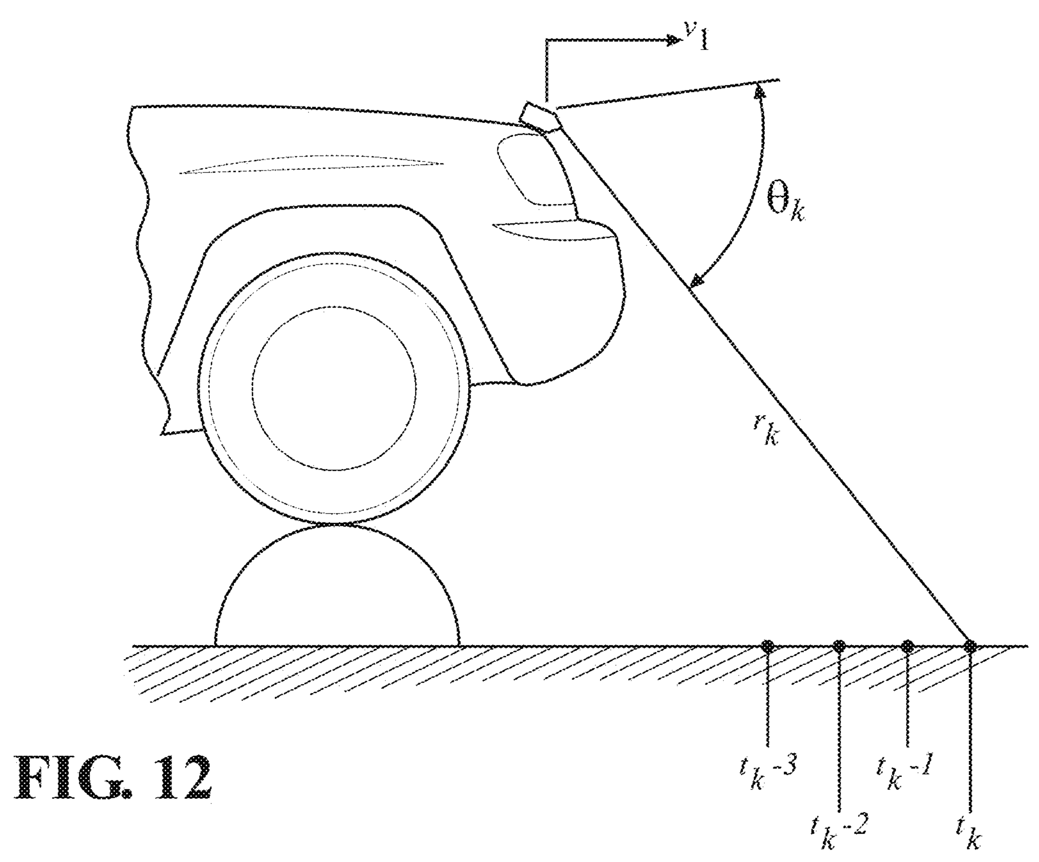
FIG. 12 is a diagram further showing an interpretation of the speedbump shown in FIG. 11 by the corrective look-ahead road profiling system, vehicle, and method, according to certain embodiments of the present disclosure.
Figure 13:
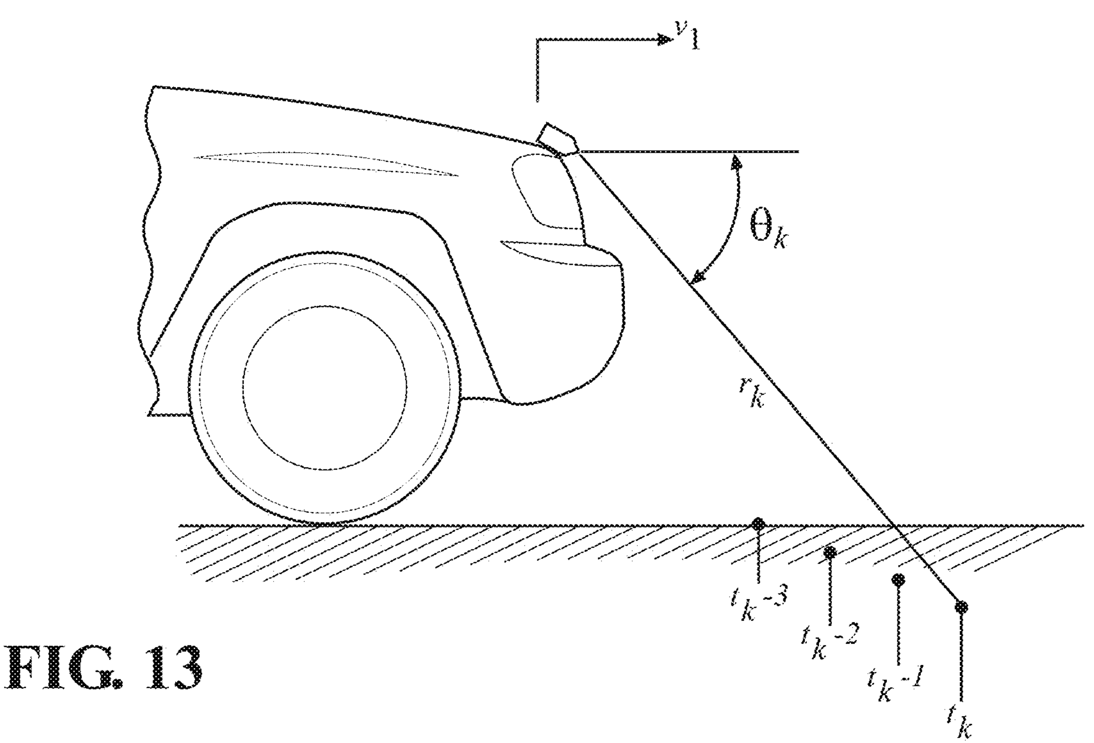
FIG. 13 is a diagram showing a calculation of the VGT of the corrective look-ahead road profiling system, vehicle, and method in view of the speedbump situations shown in FIGS. 11 and 12, according to certain embodiments of the present disclosure.
Figure 14:
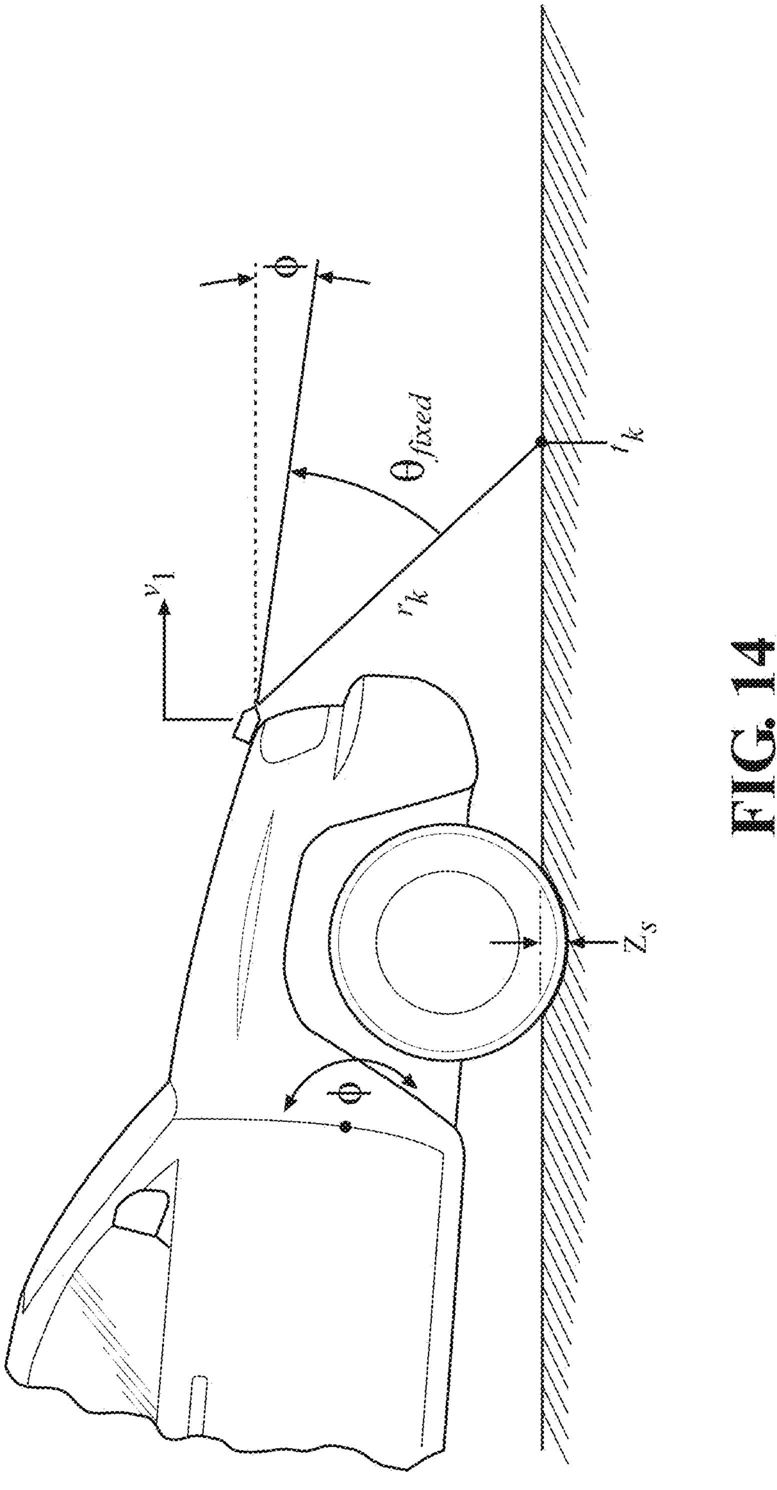
FIG. 14 is a diagram further showing vehicle travel into a pothole of a road surface with use of the corrective look-ahead road profiling system, vehicle, and method, according to certain embodiments of the present disclosure.

In one particular example, as shown in FIGS. 4-15, the CLARPS is a device/system designed to provide an online road profile measurement at a fixed spatial sampling rate for use with active suspension systems. CLARPS may feature a single-point distance measurement sensing of the road surface, leverages existing control strategies from the literature, and corrects for vehicle sprung mass body motions. Currently, the system only considers the vehicle motions in the X-Z operating plane of the vehicle, which includes longitudinal velocity, body pitch, and body heave. The system model used to develop CLARPS is referred to as the VGT, which outlines the X-Z plane and the associated parameters, for example, as shown in FIGS. 4 and 5.

As illustrated, the initial model of the CLARPS was developed by establishing a simplified operating geometry of a vehicle based on the Rear Tire Contact patch (RW) the Front Tire Contact Patch (FW) and the Height of the Look-Ahead Sensor, which for this work, is assumed to be at the height of the vehicle's headlight (HL) the resultant geometry has been monikered as the Vehicle Geometric Triangle, or the VGT.

Referring to FIG. 4. particular parameters associated with the VGT and the CLARPS may include:

1. Establishing the DATUM in the X-Z plane
2. Vertical heave experienced at the front-tire contact patch (Zs)
3. Pitch experienced by the VGT (Φ)
4. Longitudinal velocity of the moving vehicle body (v)
5. The Look-ahead measurement distance (Xk)
6. The angle at which the look-ahead measurement is taken (Θ) &
7. The vertical road profile data (Zr) at a time (t+Tp) and distance (xk) ahead of the front-tire contact patch.

The CLARPS system can be characterized by the control logic diagram shown in FIG. 5, which also outlines its three subsystems. These subsystems, as mentioned above and introduced in subsequent order, are the AGF, the AKS, and the MCA.

The AGF utilizes the measured inputs of longitudinal velocity (v), pitch (ϕ), and heave (z_s), experienced by the vehicle body, to generate a reference angle (θ_Ref) for the CLARPS look-ahead sensor to view and take measurement distance data (r_k). The reference angle is then utilized by the AKS, which is designed to maintain a consistent look-ahead sensing angle, as the CLARPS sensor body is subjected to the aforementioned body inputs of velocity, pitch, and heave. The MCA takes all of the measured inputs (velocity, pitch, heave, reference angle, and actual angle (of the AKS at its instance in time, θ_Act), as well as the look-ahead measurement distance, to yield accurate measurement data of the oncoming road profile by correcting for shifts in the measurement frame-of-reference. The resultant corrected road profile measurement is then bisected into its vertical height component at a time ahead of the vehicle (z_r(t+T_P)), as well as its longitudinal position ahead (x_k) of the Front-tire contact patch. The current look-ahead sensing envelope has been determined after consulting existing active suspension actuation literature and the minimum time required for those systems to receive input data (road profile data) and compute an adequate response. The viewing distance ahead of the vehicle, for example, as shown in FIG. 9, corresponds to the generated reference angle of the AGF, and the AKS required to maintain this angle to ensure an active suspension system would be able to utilize the CLARPS output road profile data.

CLARPS simulated validation is promising for real-world application with minimum 67% and maximum 88% road profile accuracy results obtained. Preliminary results have prompted the construction of a physical prototype(s). The first prototype consists of a first iteration AKS (initial operation and proof of concept shown in FIGS. 23-24).

Further work may consist of building and assembling a whole CLARPS, which will employ a second iteration of the AKS. Further work will consist of the following: Expanding the system model and simulation environment development to capture full vehicle operating conditions and planes, i.e., incorporating the XY and YZ planes, and developing the system for full 3D implementation and use (initial 3D system model shown in FIGS. 23-24).

Further intent for the CLARPS system would be to implement grid point measurements to better capture and characterize road profile data that the vehicle tire contact patch would encounter, for example, as shown in FIG. 18. To further expand on this, the multi-point measurement grid could also be integrated with existing camera systems on consumer vehicles to increase robustness of oncoming road surfaces and obstacles, for example, as shown in FIGS. 19-21.

Additionally, by incorporating steering wheel input, the CLARPS could continue to expand its capability by tracking/viewing the intended tire travel path and obtaining road profile data whilst the vehicle is performing a turning/steering maneuver.

A Simulation Model for an Online Corrective Look-Ahead Road Profiling System (CLARPS)

In a further example, as detailed in the 2024 SAE International® publication of the Applicant, titled "A Simulation Model for an Online Corrective Look-Ahead Road Profiling System (CLARPS) for Active Suspension Applications" by Morrison et al, SAE 2024-01-2758, 9 Apr. 2024, the entire disclosure of which is hereby incorporated herein by reference, the CLARPS is developed to significantly enhance the performance of active suspension systems in vehicles through precise road profiling. The system employs a single-point LiDAR sensor to continuously measure the road surface ahead of the vehicle. This data is helpful for the active suspension system, which requires accurate, real-time road profile information to adjust the vehicle's suspension settings preemptively, thereby improving ride comfort and handling stability.

The architecture of CLARPS is meticulously designed to include three main components: the AGF; the AKS; and the MCA. The AGF utilizes inputs such as the vehicle's velocity, pitch, and heave to calculate an optimal look-ahead angle for the LiDAR sensor. This angle helps in capturing the most relevant road profile data. The AKS then maintains this angle, adjusting the sensor dynamically to counteract any vehicular motion that could skew the data. The MCA corrects the incoming road profile data by compensating for any shifts in the measurement frame of reference, ensuring the output is both accurate and reliable. The look-ahead distance provides an active suspension actuator with enough time to compute and respond to road profile input data that the CLARPS would transmit. In one example, the look-ahead distance is maintained to provide 0.25 seconds for a viewing envelope to be determined for the CLARPS while the vehicle body is travelling at different speeds.

The effectiveness of CLARPS was validated through a series of simulations conducted in a MATLAB/Simulink environment, as detailed in the SAE paper. These simulations tested the system's response to various road conditions, including flat surfaces, speed bumps, and potholes, under different vehicle speeds.

In sum, the 2024 SAE International paper introduces the initial development of the CLARPS technology, focusing on its ability to provide online road profile measurements at a fixed spatial sampling rate for active suspension systems. The paper identifies two major challenges in online road profiling: computational complexity with limited in-vehicle computing resources, and the complex vehicle body movements that affect measurement accuracy. The CLARPS system was designed to address these challenges through efficient single-point LiDAR sensing and correction for vehicle sprung mass motion.

The system architecture consists of three main components: the AGF; the AKS; and the MCA. The paper details the development of the AGF, which uses vehicle velocity, pitch, and heave measurements to determine optimal look-ahead angles for the sensor. The simulation environment was developed using MATLAB/Simulink to validate the system's performance, with particular focus on testing three road profiles: flat, speed bump, and pothole configurations.

Initial simulation results demonstrated promising performance, with the system achieving up to 88% accuracy in road profile recreation at slower speeds (25 km/h) and maintaining at least 63% accuracy even at maximum speed (100 km/h). The paper concludes by outlining next steps, including the full definition of the AKS and MCA components, comparative analysis of control strategies, and the development of a physical prototype. The simulation results validated that CLARPS could provide adequate information to improve active suspension system performance.

A Simulation Model for an Online Corrective Look-Ahead Road Profiling System (CLARPS) for Active Suspension Applications In a further example, as detailed in the 2025 technical research paper of the Applicant, titled "Improved Model and Physical Prototype of an Online Corrective Look-Ahead Road Profiling System (CLARPS) for Active Suspension Applications", SAE publication 2025-01-8790, the entire disclosure of which is hereby incorporated herein by reference, the CLARPS is designed to enhance vehicle suspension systems by providing advanced road profiling capabilities. The system utilizes a single-point LiDAR sensor to measure road profiles ahead of the vehicle, which is used for active suspension systems that need to adjust in real-time to road irregularities. The system's architecture is built around a vehicle geometric triangle (VGT), which simplifies the vehicle's dynamic responses into a manageable model, focusing on longitudinal velocity, body pitch, and body heave.

As indicated above, the CLARPS system is structured into three main components: AGF; AKS; and MCA. The AGF calculates an optimal look-ahead angle for the sensor based on the vehicle's speed, pitch, and heave, ensuring that the road profile is measured with high accuracy. The AKS maintains this angle consistently, despite any dynamic changes in the motion of the vehicle. The prototype AKS uses a servo motor with feedback control that dynamically adjusts sensor orientation based on vehicle pitch, heave, and velocity. The MCA processes these measurements to correct any deviations caused by shifts in the measurement frame of reference, ensuring the data's accuracy by adjusting the road profile measurements to match the actual road conditions. Preliminary development of the CLARPS revolved around three primary design considerations: Spatial Sampling Resolution, Shifting of the Measurement Frame-of-Reference, and Computation-Response Time for Actuation.

This system was rigorously tested in a simulation environment, as illustrated. The simulation used MATLAB/Simulink to model the vehicle dynamics and the CLARPS system's response to various road profiles, such as flat surfaces, speed bumps, and potholes.

In sum, the 2025 SAE International paper details improvements to the CLARPS for automotive active suspension applications. The paper builds upon previous work by expanding the mathematical formulations, improving system simulation, and validating a physical prototype. The innovation of CLARPS lies in its ability to maintain consistent spatial sampling rates at different vehicle speeds and correct for vehicle body motions in real-time, addressing two major challenges in online road profiling applications.

The system architecture consists of three main subsystems: AGF, the AKS, and the MCA. The paper introduces an important correction through the pitch scaling factor (PSF) and demonstrates that mounting the CLARPS sensor at the headlight position provides optimal performance compared to roof or mirror mounting locations. Physical testing was conducted using a MagneMover Lite™ magnetic conveyor system with 3D printed road profiles to validate the system's performance.

The experimental results showed that the CLARPS prototype could achieve road profile accuracy between 64% to 76% with a spatial resolution of 12 mm. The system demonstrated a computation-response time of 24 ms per cycle, during which it measures external disturbances, performs servo commands, executes corrective calculations, and stores data. When integrated with an active suspension system, this would result in a total computation-response time of 0.274 seconds (including 0.25 seconds for active suspension computation).

As shown in FIGS. 25A-C, the CLARPS system's performance was validated through comparison of real road profiles (shown with dotted lines) versus acquired and corrected road profile measurements (shown with solid lines). The figures illustrate the system's ability to accurately measure and recreate different road surface conditions.

FIG. 25A demonstrates the system's performance on a flat road surface, where the dotted line represents the actual flat profile and the solid line shows the CLARPS-measured profile. FIG. 25B illustrates measurement of a speed bump, with the dotted line showing the true speed bump profile and the solid line displaying the system's acquired measurements. FIG. 25C depicts measurement of a pothole condition, where again the dotted line represents the actual road profile and the solid line shows the CLARPS system's measured profile.

The system achieved road profile accuracy between 67% and 88% across these test conditions. Some noise is present within each data set, which can be attributed to friction experienced on the test conveyor that caused slowdowns and subsequent rocking of the prototype device. Additionally, the LiDAR sensor's 1.0 cm operating resolution resulted in some loss of resolution in the acquired road profiles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for enhancing active suspension in vehicles, comprising:
  - a look-ahead sensor configured to measure road profiles at a predetermined distance ahead of a vehicle;
  - a processing unit configured to receive data from the look-ahead sensor and compute road conditions based on vehicle dynamics including speed, pitch, and heave;
  - an active suspension controller configured to receive the road conditions computed from the processing unit and adjust suspension settings of the vehicle preemptively;
  - a data storage unit configured to store historical road condition data and suspension adjustments corresponding with the historical road condition data; and
  - a communication interface in communication with and configured to facilitate data exchange between the look-ahead sensor, the processing unit, the active suspension controller, and the data storage unit.

2. The system of claim 1, further including an angle keeping system for dynamically adjusting an orientation of the look-ahead sensor.

3. The system of claim 2, wherein the angle keeping system includes a servo motor with feedback control for maintaining a desired orientation relative to a moving vehicle body.

4. The system of claim 3, further including an inertial measurement unit configured to detect vehicle pitch and heave.

5. The system of claim 3, wherein the look-ahead sensor includes a single point LiDAR unit and road profile data is resolved into vertical and longitudinal components.

6. The system of claim 5, wherein the look-ahead sensor includes an array of single point LiDAR units.

7. The system of claim 2, wherein the processing unit uses a model predictive control algorithm to compute sensor orientation and predict road profile characteristics.

8. The system of claim 7, wherein the communication interface provides a sequential buffer of corrected road height and position data for predictive actuation.

9. The system of claim 2, wherein the system is configured to account for real-time changes in vehicle speed, pitch, and vertical motion when calculating look-ahead sensor angle.

10. The system of claim 3, wherein the servo motor is configured to operate with tunable feedback control to minimize angular overshoot and maintain optimal sensor positioning.

11. A vehicle, comprising:
  - an active suspension system;
  - a look-ahead road profiling system for enhancing active suspension in vehicles, the look-ahead road profiling system including a look-ahead sensor installed on a vehicle and configured to measure road profiles ahead of the vehicle;
  - a processing unit installed on the vehicle configured to compute anticipated road conditions from data received from the look-ahead sensor;
  - an active suspension controller integrated with the active suspension system of the vehicle, configured to receive computed road conditions and adjust suspension settings of the vehicle preemptively; and
  - a data storage unit integrated with the vehicle for storing road condition data and the suspension settings corresponding with the road condition data.

12. The vehicle of claim 11, wherein the look-ahead road profiling system further includes an angle keeping system for dynamically adjusting sensor orientation.

13. The vehicle of claim 12, wherein the angle keeping system includes a servo motor with feedback control for maintaining a desired orientation relative to a moving vehicle body.

14. The vehicle of claim 13, wherein the look-ahead road profiling system further includes an inertial measurement unit configured to detect vehicle pitch and heave.

15. The vehicle of claim 14, wherein the look-ahead sensor includes a single point LiDAR unit, and the road profile data is resolved into vertical and longitudinal components.

16. The vehicle of claim 13, wherein the processing unit uses a model predictive control algorithm to compute sensor orientation and predict road profile characteristics, and the system is configured to account for real-time changes in vehicle speed, pitch, and vertical motion when calculating look-ahead sensor angle.

17. A method of using an active suspension enhancement system in a vehicle, the method comprising:
  - measuring road profiles ahead of the vehicle using a look-ahead road profiling system for enhancing active suspension in vehicles, the look-ahead road profiling system including a look-ahead sensor installed on the vehicle and configured to measure road profiles ahead of the vehicle;
  - computing anticipated road conditions based on the road profiles as measured and vehicle dynamics including speed, pitch, and heave using a processing unit;
  - adjusting suspension settings of the vehicle preemptively based on the road conditions as computed using an active suspension controller;
  - storing the road profiles as measured and suspension settings corresponding with the measured road profiles in a data storage unit; and
  - updating algorithms of the look-ahead road profiling system based on feedback received from the active suspension system.

18. The method of claim 17, further comprising a step of adjusting dynamically an orientation of the look-ahead sensor using an angle keeping system.

19. The method of claim 17, further comprising a step of using a model predictive control algorithm to compute sensor orientation and predict road profile characteristics.

20. A method of claim 17, further comprising a step of operating a servo motor with tunable feedback control to minimize angular overshoot and maintain optimal sensor positioning.

* * * * *